United States Patent [19]

Shiraishi et al.

[11] Patent Number: 4,873,638
[45] Date of Patent: * Oct. 10, 1989

[54] TRACTION CONTROL SYSTEM FOR CONTROLLING SLIP OF A DRIVING WHEEL OF A VEHICLE

[75] Inventors: Shuji Shiraishi; Takashi Nishihara, both of Saitama, Japan

[73] Assignee: Honda Giken Kogyo Kabushiki Kaisha, Tokyo, Japan

[*] Notice: The portion of the term of this patent subsequent to Oct. 10, 2006 has been disclaimed.

[21] Appl. No.: 48,424

[22] Filed: May 11, 1987

[30] Foreign Application Priority Data

| May 9, 1986 | [JP] | Japan | 61-107240 |
| May 9, 1986 | [JP] | Japan | 61-107241 |
| May 9, 1986 | [JP] | Japan | 61-107242 |
| May 9, 1986 | [JP] | Japan | 61-107243 |
| May 9, 1986 | [JP] | Japan | 61-107244 |

[51] Int. Cl.$^4$ .............................................. B60T 8/58
[52] U.S. Cl. ........................ 364/426.01; 364/426.02; 364/426.03; 303/96; 303/100; 180/197
[58] Field of Search ................... 303/111, 110, 96, 95, 303/100, 106, 109; 364/426, 426.01, 426.02, 426.03; 361/238; 180/197

[56] References Cited

U.S. PATENT DOCUMENTS

| 3,169,595 | 2/1965 | Shephard | 180/271 |
| 3,288,232 | 11/1966 | Shepherd | 180/271 |
| 3,400,776 | 9/1968 | Smith | 180/197 |
| 3,532,392 | 10/1970 | Scharlack | 303/104 |
| 3,532,393 | 10/1970 | Riordan | 303/104 |
| 3,560,759 | 2/1971 | Buehler et al. | 290/117 |
| 3,586,385 | 6/1971 | Florus et al. | 303/96 |
| 3,617,099 | 11/1971 | Sugiyama | 303/96 |
| 3,622,973 | 11/1971 | Domann et al. | 340/52 R |
| 3,627,074 | 12/1971 | Burckhardt | 180/197 |
| 3,632,176 | 1/1972 | Gaeke | 303/100 |
| 3,659,263 | 4/1972 | Gunsser et al. | 340/52 R |
| 3,659,906 | 5/1972 | Horvath | 303/100 |
| 3,667,813 | 6/1972 | Burckhardt et al. | 303/96 |
| 3,680,655 | 8/1972 | Beyerlein et al. | 180/54.1 |
| 3,701,568 | 10/1972 | Lewis | 303/109 |
| 3,741,043 | 6/1973 | Oya et al. | 74/866 |
| 3,771,839 | 11/1973 | Fink | 303/105 |
| 3,776,322 | 12/1973 | Misch et al. | 172/2 |
| 3,776,357 | 12/1973 | Arai et al. | 180/197 |
| 3,779,331 | 12/1973 | Burckhardt et al. | 180/197 |
| 3,780,346 | 12/1973 | Gagnon | 361/238 |
| 3,802,529 | 4/1974 | Burckhardt et al. | 180/197 |
| 3,802,749 | 4/1974 | Carp et al. | 303/96 |

(List continued on next page.)

FOREIGN PATENT DOCUMENTS

| 0163940 | 12/1985 | European Pat. Off. . |
| 0166258 | 1/1986 | European Pat. Off. . |
| 0174662 | 3/1986 | European Pat. Off. . |
| 0186122 | 7/1986 | European Pat. Off. . |
| 2435679 | 2/1975 | Fed. Rep. of Germany . |
| 2616228 | 11/1977 | Fed. Rep. of Germany . |
| 2832739 | 2/1980 | Fed. Rep. of Germany . |
| 3417423 | 11/1985 | Fed. Rep. of Germany . |
| 2155348 | 6/1973 | France . |
| 2534198 | 4/1984 | France . |

(List continued on next page.)

Primary Examiner—Eugene R. LaRoche
Assistant Examiner—Seung Ham
Attorney, Agent, or Firm—Armstrong, Nikaido, Marmelstein, Kubovcik & Murray

[57] ABSTRACT

A traction control system controls the slip of a driving wheel of a vehicle having at least two driving wheels. The traction control system includes a driving wheel speed sensor for sensing the speed of the driving wheels and for generating a driving wheel speed signal as a function thereof, a vehicle speed sensor for sensing the speed of the vehicle and for generating a vehicle speed signal as a function thereof, and a first selecting circuit, included within the driving wheel speed sensor and operatively connected to said vehicle speed sensor, for generating the driving wheel speed signal in response to the vehicle speed signal. The system also provides for a controller responsive to the driving wheel speed signal from the first selecting circuit for controlling the slip of the driving wheel.

45 Claims, 12 Drawing Sheets

U.S. PATENT DOCUMENTS

| | | | |
|---|---|---|---|
| 3,811,526 | 5/1974 | Adahan | 180/197 |
| 3,823,373 | 7/1974 | Pike | 324/73 |
| 3,871,235 | 3/1975 | Anderson | 73/510 |
| 3,910,647 | 10/1975 | Takeuchi | 303/100 |
| 3,920,280 | 11/1975 | Luhdorff et al. | 303/106 X |
| 3,929,382 | 12/1975 | McNinch, Jr. et al. | 303/106 |
| 3,938,612 | 2/1976 | Boudeville et al. | 180/197 |
| 3,941,203 | 3/1976 | Leconte | 180/197 |
| 3,967,862 | 7/1976 | Hunter | 303/103 |
| 3,972,568 | 8/1976 | Fleischer | 303/106 X |
| 4,066,300 | 1/1978 | Devlin | 303/96 |
| 4,154,487 | 5/1979 | Vannini et al. | 303/106 |
| 4,312,249 | 1/1982 | Hau et al. | 74/866 |
| 4,321,676 | 3/1982 | Ohmori | 364/426 |
| 4,347,569 | 8/1982 | Allen, Jr. et al. | 364/426 |
| 4,354,568 | 10/1982 | Griesenbock | 180/197 |
| 4,375,599 | 3/1983 | Bleckmann et al. | 307/519 |
| 4,420,191 | 12/1983 | Arikawa et al. | 303/106 X |
| 4,432,430 | 2/1984 | Lind et al. | 180/197 |
| 4,480,309 | 10/1984 | Burckhardt et al. | 364/426 |
| 4,521,856 | 6/1985 | Phelps et al. | 364/426 |
| 4,545,455 | 10/1985 | Kanemura et al. | 180/197 |
| 4,554,990 | 11/1985 | Kamiya et al. | 180/197 |
| 4,576,419 | 3/1986 | Leiber | 303/111 X |
| 4,583,611 | 4/1986 | Frank et al. | 180/197 |
| 4,625,824 | 12/1986 | Leiber | 180/197 |
| 4,652,060 | 3/1987 | Miyake | 303/111 X |
| 4,657,313 | 4/1987 | Fennel et al. | 303/111 X |
| 4,750,125 | 6/1988 | Leppek et al. | 303/95 X |
| 4,753,493 | 6/1988 | Arikawa | 303/111 X |

FOREIGN PATENT DOCUMENTS

| | | |
|---|---|---|
| 44-27169 | 11/1969 | Japan . |
| 47-43691 | 12/1972 | Japan . |
| 48-18695 | 3/1973 | Japan . |
| 49-14566 | 4/1974 | Japan . |
| 49-15876 | 4/1974 | Japan . |
| 49-40814 | 11/1974 | Japan . |
| 50-5764 | 3/1975 | Japan . |
| 50-13530 | 5/1975 | Japan . |
| 50-112927 | 9/1975 | Japan . |
| 51-19239 | 2/1976 | Japan . |
| 51-39828 | 4/1976 | Japan . |
| 51-28888 | 8/1976 | Japan . |
| 51-31915 | 9/1976 | Japan . |
| 51-32198 | 9/1976 | Japan . |
| 51-35974 | 10/1976 | Japan . |
| 51-111577 | 10/1976 | Japan . |
| 51-48236 | 12/1976 | Japan . |
| 51-48334 | 12/1976 | Japan . |
| 52-198 | 1/1977 | Japan . |
| 52-35837 | 9/1977 | Japan . |
| 52-140790 | 11/1977 | Japan . |
| 53-4194 | 2/1978 | Japan . |
| 53-24687 | 7/1978 | Japan . |
| 53-77991 | 7/1978 | Japan . |
| 53-30877 | 8/1978 | Japan . |
| 53-104092 | 9/1978 | Japan . |
| 54-2449 | 2/1979 | Japan . |
| 54-42077 | 12/1979 | Japan . |
| 55-31017 | 8/1980 | Japan . |
| 55-46494 | 11/1980 | Japan . |
| 56-15340 | 4/1981 | Japan . |
| 56-37095 | 8/1981 | Japan . |
| 56-108310 | 8/1981 | Japan . |
| 56-38422 | 9/1981 | Japan . |
| 57-15051 | 1/1982 | Japan . |
| 58-8434 | 1/1983 | Japan . |
| 5816947 | 1/1983 | Japan . |
| 58-36731 | 3/1983 | Japan . |
| 58-53520 | 3/1983 | Japan . |

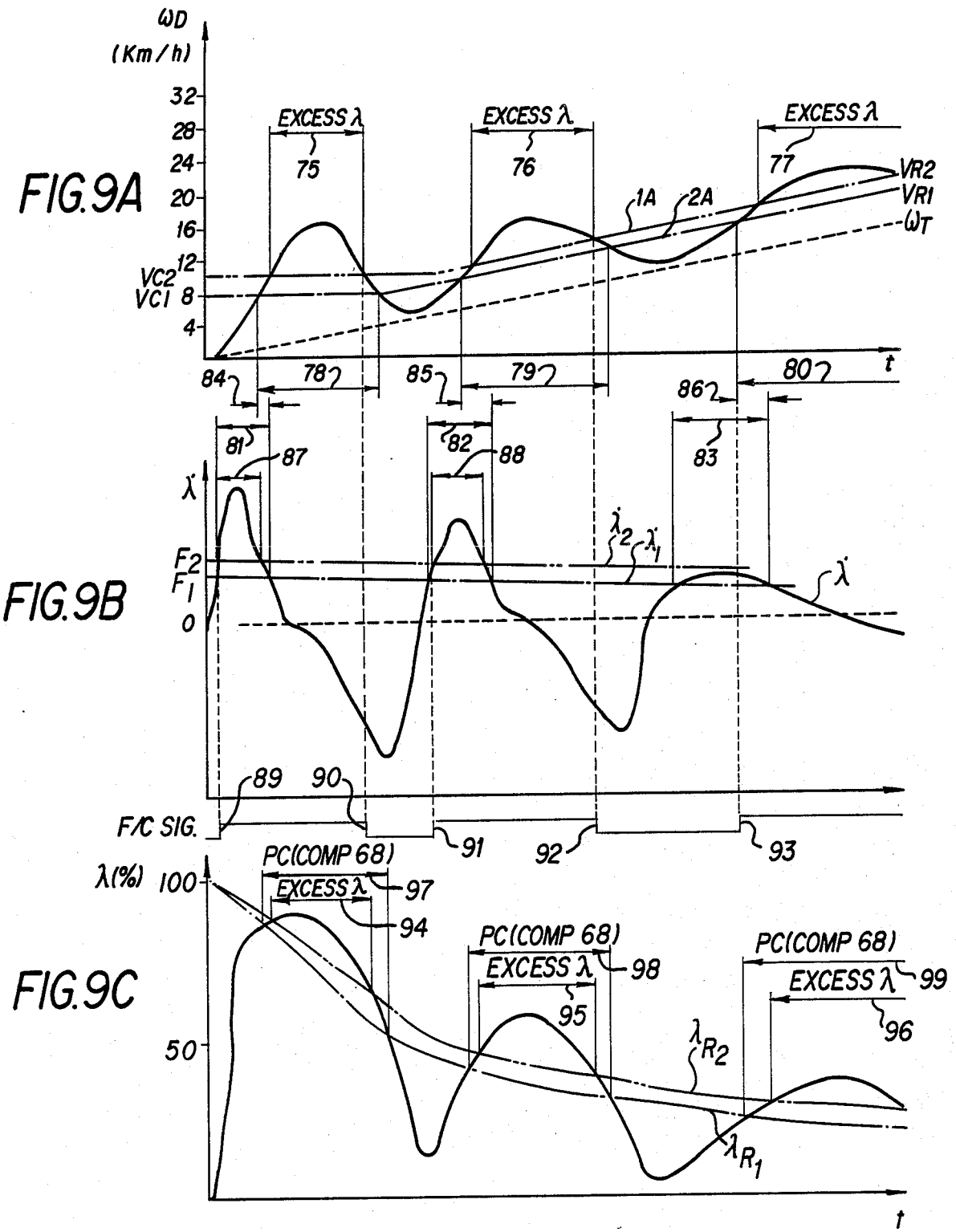

TRACTION CONTROL SYSTEM FOR CONTROLLING SLIP OF A DRIVING WHEEL OF A VEHICLE

BACKGROUND OF THE INVENTION

The present invention relates to a traction control system for controlling the slip of a driving wheel or wheels of a vehicle, and more particularly to a traction control system for controlling the slip of a driving wheel or wheels during acceleration or the starting up of the vehicle.

Generally, when the traction force of the driving wheels during acceleration or the starting up of the vehicle becomes greater than a friction force between a wheel and the road surface [(a coefficient of friction between the wheel and the road surface) x (load on a driving wheel by the vehicular weight (vehicular load))], the driving wheels slip. A slip rate $\lambda$ indicating a degree of such slip is obtained by the following equation (I), where $V_w$ denotes a circumferential speed of the driving wheels, and V denotes a vehicle speed (a circumferential speed of driven wheels).

$$\lambda = (V_w - V)/V_w \tag{I}$$

As shown in FIG. 6, the friction force between the wheel and the road surface (Namely, a limit value of the traction force of the driving wheels) varies with the slip rate $\lambda$, and the friction force represented on the vertical axis reaches its maximum value at a predetermined value $\lambda_0$. While the friction force between the wheel and the road surface is a friction force in a forward direction (longitudinal direction) of the vehicle, a friction force in a lateral direction (side force) is decreased with an increase in the slip rate $\lambda$ as indicated by a dotted line in FIG. 6.

On the basis of this point, there has been proposed a control method for detecting a slip rate $\lambda$ which maximizes the longitudinal friction force between the wheel and the road surface to maximize the driving efficiency of the vehicle and also suppresses the decrease in the lateral friction force between the wheel and the road surface in order to prevent side slip of the vehicle, and for approximating the slip rate $\lambda$ to the predetermined value $\lambda_0$. Specifically, in the conventional method, a lower limit value $\lambda_1$ and an upper limit value $\lambda_2$ of the slip rate $\lambda$ define a predetermined range including the predetermined value $\lambda_0$, and $\lambda_1$ and $\lambda_2$ are set according to the vehicle speed V. The torque of the driving wheels is controlled by a driving wheel torque control device according to a value of the slip rate $\lambda$ calculated from the driving wheel speed $V_w$ and the vehicle speed V. Consequently the circumferential speed $V_w$ of the driving wheels is controlled and the slip rate $\lambda$ of the driving wheels is feed-back controlled within the predetermined range $\lambda_1$-$\lambda_2$.

In the conventional method mentioned above, the vehicle speed V used in the calculation of the slip rate $\lambda$, in accordance with the equation (I), is obtained by an average $(\omega_{LR}+\omega_{RR})/2$ of speeds $\omega_{LR}$ and $\omega_{RR}$ of the left and right trailing (or driven) wheels (rear wheels of a front-wheel drive type vehicle, for example), $(V=\omega_{LR}+\omega_{RR}/2)$. While the driving wheels are those supplied with power, the trialing (or driven) wheels are those not supplied with power. For example, in a front wheel drive vehicle, the front wheels are driving wheels and the rear wheels are trailing wheels. Conversely, in a rear wheel drive car, the rear wheels are the driving wheels, while the front wheels are considered to be the trailing wheels. This method of calculating the vehicle speed V is intended to prevent an error in detecting the vehicle speed V due to inner wheel off-tracking whether the vehicle is turning left or turning right. However, a difference in tracking distance is generated due to the turning difference between the driving wheels (the front wheels in a front-wheel drive vehicle, for example) and the trailing wheels during the turning of the vehicle. Accordingly, even when the driving wheels are not slipping, the vehicle speed V obtained in the above manner is different from both the left and right driving wheel speeds $\omega_{LF}$ and $\omega_{RF}$. As a result, if the slip rate $\lambda$ is calculated in accordance with equation I, a non-slip condition of $\lambda=0$ is not obtained. Therefore in a conventional system, slip control of the driving wheels is carried out under the condition where the driving wheels are apparently slipping based upon the above calculated vehicle speed V. Furthermore, even when the slipping of the driving wheels is actually very small, it may be incorrectly determined that the slip is excessive, and thus the slip control following this determination is erroneously carried out.

SUMMARY OF THE INVENTION

It is an object of the present invention to provide a slip control method for a driving wheel or wheels of a vehicle, which reduces an apparent slip during the turning of the vehicle and thus ensures more precise detecting of the slip rate.

According to the present invention, a traction control system is provided for controlling excess slip of a driving wheel of a vehicle having at least two driving wheels. The system includes a driving wheel speed sensor for sensing the speed of the driving wheels and for generating a driving wheel speed signal as a function thereof, and a vehicle speed sensor means for sensing the speed of the vehicle and for generating a vehicle speed signal as a function thereof. Further, a first selecting circuit means is provided, which is included within the driving wheel speed sensor means, and is operatively connected to the vehicle speed sensor means. The first selecting circuit means generates the driving wheel speed signal in response to the vehicle speed signal. Additionally, a control means, which is responsive to the driving wheel speed signal from the first selecting circuit means, controls the excess slip of the driving wheel.

BRIEF DESCRIPTION OF THE DRAWINGS

The advantages of the invention will become apparent in the following description taken in conjunction with the drawings, wherein:

FIG. 9A is a graph showing the values of the driving wheel speed signal versus time;

FIG. 9B is a graph showing the values of the differential slip rate as a function of time;

FIG. 9C is a graph showing the slip rate λ as a function of time as used in an alternate embodiment of the instant invention;

DETAILED DESCRIPTION OF THE PREFERRED EMBODIMENT

Figure 1:
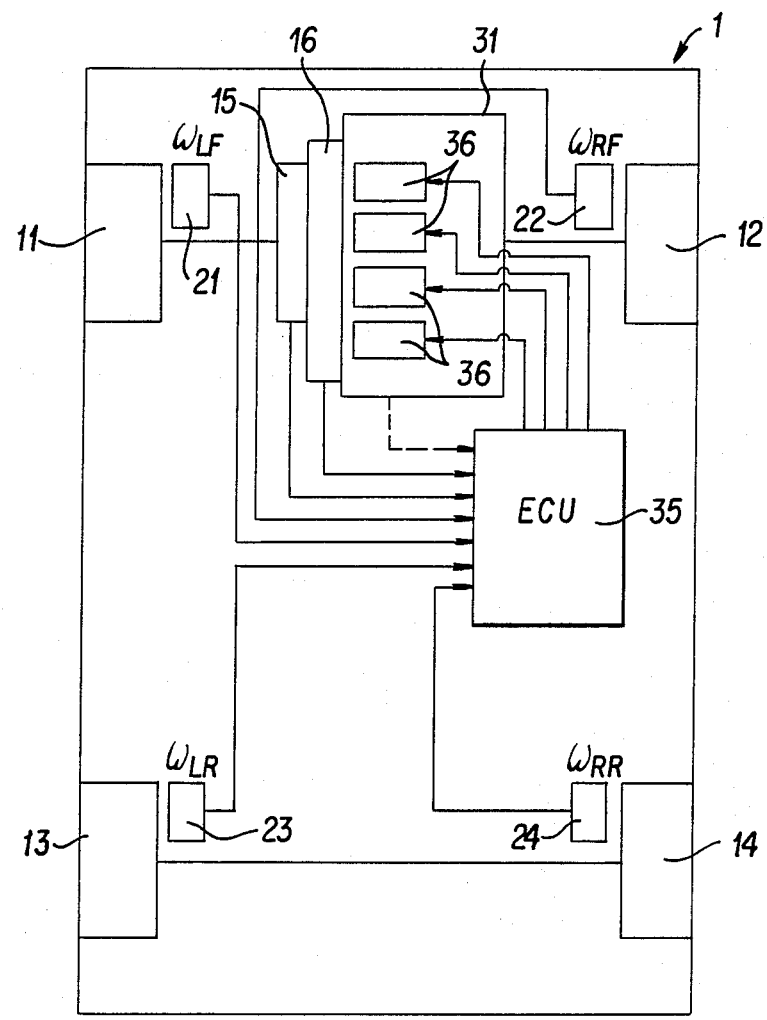
FIG. 1 is a schematic illustration of a vehicle employing the slip control method for the driving wheels of the vehicle according to the present invention.

FIG. 1 illustrates a vehicle 1 employing the slip control method for the driving wheels of the vehicle according to the present invention. Vehicle 1 is, for example, a front-wheel drive vehicle having front wheels 11 and 12 as the driving wheels adapted to be driven by an engine 31 and having rear wheels 13 and 14 as trailing wheels. As will be apparent from the following description, the present invention is similarly applicable to a rear-wheel drive vehicle where the rear wheels are the driving wheels and the front wheels are the trailing wheels. The driving wheels 11 and 12 are provided with driving wheel speed sensors 21 and 22, respectively, while the trailing wheels 13 and 14 are provided with trailing wheel speed sensors 23 and 24, respectively. Left and right driving wheel speeds $\omega_{LF}$ and $\omega_{RF}$ are detected by the driving wheel speed sensors 21 and 22, respectively, while left and right trailing wheel speeds $\omega_{LR}$ and $\omega_{RR}$ are detected by the trailing wheel speed sensors 23 and 24, respectively. The detection signals (from the speed sensors 21 to 24) are input into ECU (electronic control unit) 35. ECU 35 first computes a vehicle speed V from an average $(\omega_{LR}+\omega_{RR})/2$ of the trailing wheel speeds $\omega_{LR}$ and $\omega_{RR}$. When the vehicle speed V is lower than a predetermined speed $V_{MIN}$ (5 km/h, for example), ECU 35 controls slip of the driving wheel having a lower speed. This is referred to as Low Select Control, that is, the lower one of the driving wheel speeds $\omega_{LF}$ and $\omega_{RF}$ is set to $\omega_F$ corresponding to the driving wheel speed $V_w$ in the afore-mentioned equation (I).

In both the Low Select Control and a corresponding High Select Control, a trailing wheel speed $\omega_{LR}$ or $\omega_{RR}$ on the same side of the vehicle as the driving wheel to be controlled is set to $\omega_R$ in substitution for the vehicle speed V in the afore-mentioned equation (I). Thus, an apparent slip upon turning of the vehicle may be reduced. Accordingly, the slip rate λ can be obtained by the following equation.

$$\lambda = (\omega_F - \omega_R)/\omega_F \quad \text{(II)}$$

Further, ECU 35 computes a differential (variation) of the slip rate λ. In digital control, a difference every operational processing cycle is substituted for the differential λ•.

Figure 6:
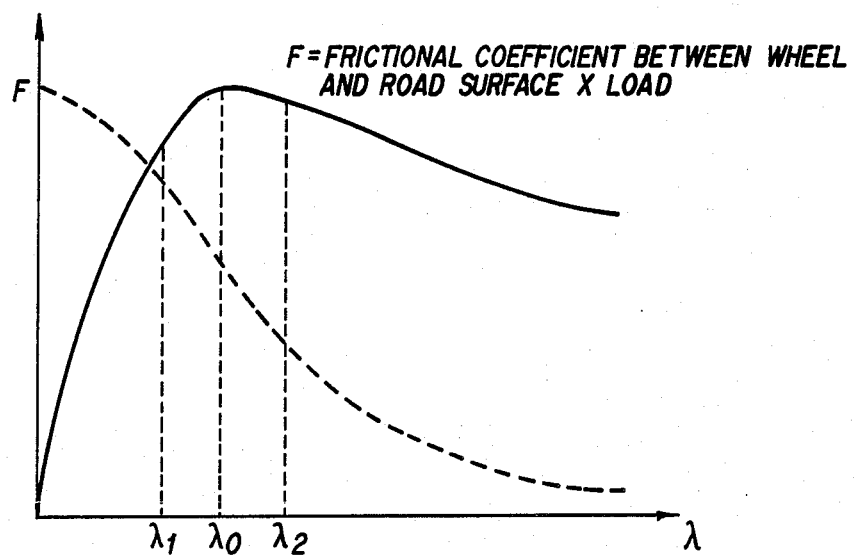
FIG. 6 is a characteristic graph of the friction force between a wheel and a road surface versus the slip rate.

A clutch 15 and a transmission 16, interposed between the engine 31 and the driving wheels 11 and 12, are provided with respective sensors not shown. A clutch signal and a transmission signal from the sensors are input to ECU 35. When ECU 35 determines from the clutch signal that the clutch 15 is engaged, it controls the engine 31 by a fuel supply control device which will be described below. ECU 35 controls the torque of the driving wheels 11 and 12 by controlling the fuel supply control device, and in turn controlling the slip rate of the driving wheels 11 and 12 (See equation (II)). Specifically, ECU 35 sets a lower limit value $\lambda_1$ and an upper limit value $\lambda_2$ within a predetermined range. The range includes the afore-mentioned value $\lambda_0$, as shown in FIG. 6. These reference values control the sliprate λ and are determined according to the vehicle speed $\omega_R$ and the gear ratio detected by a transmission signal. Furthermore, ECU 35 sets first and second reference value $\lambda^{\bullet}_1$ and $\lambda^{\bullet}_2$ ($\lambda^{\bullet}_2 > \lambda^{\bullet}_1$) for control of the differential $\lambda^{\bullet}$ of the slip rate according to the vehicle speed $\omega_R$, the gear ratio, a control delay from an operation commanding the fuel supply control device to start operation thereof, and the above-mentioned slip rate control reference values. Then, ECU 35 controls the fuel supply control device according to a difference between the driving wheel speed $\omega_F(\omega_{LF}$ or $\omega_{RF})$ and a predetermined speed $V_{R1}$ depending upon the lower limit value $\lambda_1$, a difference between the driving wheel speed $\omega_F$ and a predetermined speed $V_{R2}$ depending upon the upper limit value $\lambda_2$, a difference between the differential $\lambda^{\bullet}$ of the slip rate and the first reference value $\lambda^{\bullet}_1$, and a difference between the differential $\lambda^{\bullet}$ and the second reference value $\lambda^{\bullet}_2$. In other words, ECU 35 controls the fuel supply control device in accordance with the following control rules:

(i) If $\omega_F > V_{R1}$ and $\lambda^{\bullet} > \lambda^{\bullet}_1$, the fuel supply control device is so controlled as to reduce the value of λ. For example, the fuel supply is cut, (prediction control);

(II) If $\omega_F > V_{R2}$, the fuel supply control device is so controlled as to reducethe value of λ. For example, the fuel supply is cut, (prevention of excess slip rate); and (III) If $\lambda^{\bullet} > \lambda^{\bullet}_2$, the fuel supply control device is so controlled as to reduce the value of λ. For example, the fuel supply is cut, (prevention of excess slip rate speed or differential slip rate).

In this case, the predetermined speeds $V_{R1}$ and $V_{R2}$ are calculated in accordance with the following equations (III) and (IV):

$$V_{R1} = k_1 \cdot \omega_R + C_1 + D_1/\omega_R \quad \text{(III)}$$

$$V_{R2} = k_2 \cdot \omega_R + C_2 + D_2/\omega_R \quad \text{(IV)}$$

Alternately, when the vehicle speed is high, the predetermined speed values $V_{R1}$ and $V_{R2}$ may be calculated in accordance with the following equations (V) and (VI), while when the vehicle speed is low, the predetermined speeds $V_{R1}$ and $V_{R2}$ may be set to constant values $V_{C1}$ and $V_{C2}$.

$$V_{R1} = k_1 \cdot \omega_R + C_1 \quad \text{(V)}$$

$$V_{R2} = k_2 \cdot \omega_R + C_2 \quad \text{(VI)}$$

Where, $k_1$, $k_2$, $C_1$, $C_2$, $D_1$ and $D_2$ are coefficients and constants for enabling $V_{R1}$ and $V_{R2}$ to correspond to the lower limit value $\lambda_1$ and the upper limit value $\lambda_2$, respectively.

The differential reference values $\lambda^{\bullet}_1$ and $\lambda^{\bullet}_2$ for control of the differential slip rate are calculated as set forth in the following equations:

$$[\lambda^{\bullet}_1] = r_1 \cdot \omega_R + F_1 \quad \text{(VII)}$$

$$[\lambda^{\bullet}_2] = r_2 \cdot \omega_R + F_2 \quad \text{(VIII)}$$

where, $r_1$ and $r_2$ are coefficients for calculating the values $\lambda^{\bullet}_1$ and $\lambda^{\bullet}_2$, respectively, according to the vehicle speed $\omega_R$. The values $r_1$ and $r_2$ are experimentally determined and have different values depending on the characteristics of each vehicle, such as torque characteristics of the engine or power train characteristics, etc. $F_1$ and $F_2$ are constants for correction of the values $\lambda^{\bullet}_1$ and $\lambda^{\bullet}_2$, respectively, according to the gear ratio, etc. of the transmission.

The purpose of using the slip rate speed (differential of the slip rate) $\lambda^{\bullet}$ in addition to the slip rate $\lambda$ to control the slip rate $\lambda$ according to the afore-mentioned control rules (i) and (iii) is such that since it is predicted that the slip rate deviates from the predetermined range $\lambda_1$–$\lambda_2$ in the case of a large differential slip rate $\lambda^{\bullet}$ even when the slip rate $\lambda$ is in the predetermined range $\lambda^{\bullet}_1$–$\lambda^{\bullet}_2$, the prediction control, or the like, to cope with this deviation is carried out to improve the responsiveness of the control of the slip rate $\lambda$.

Figure 2:
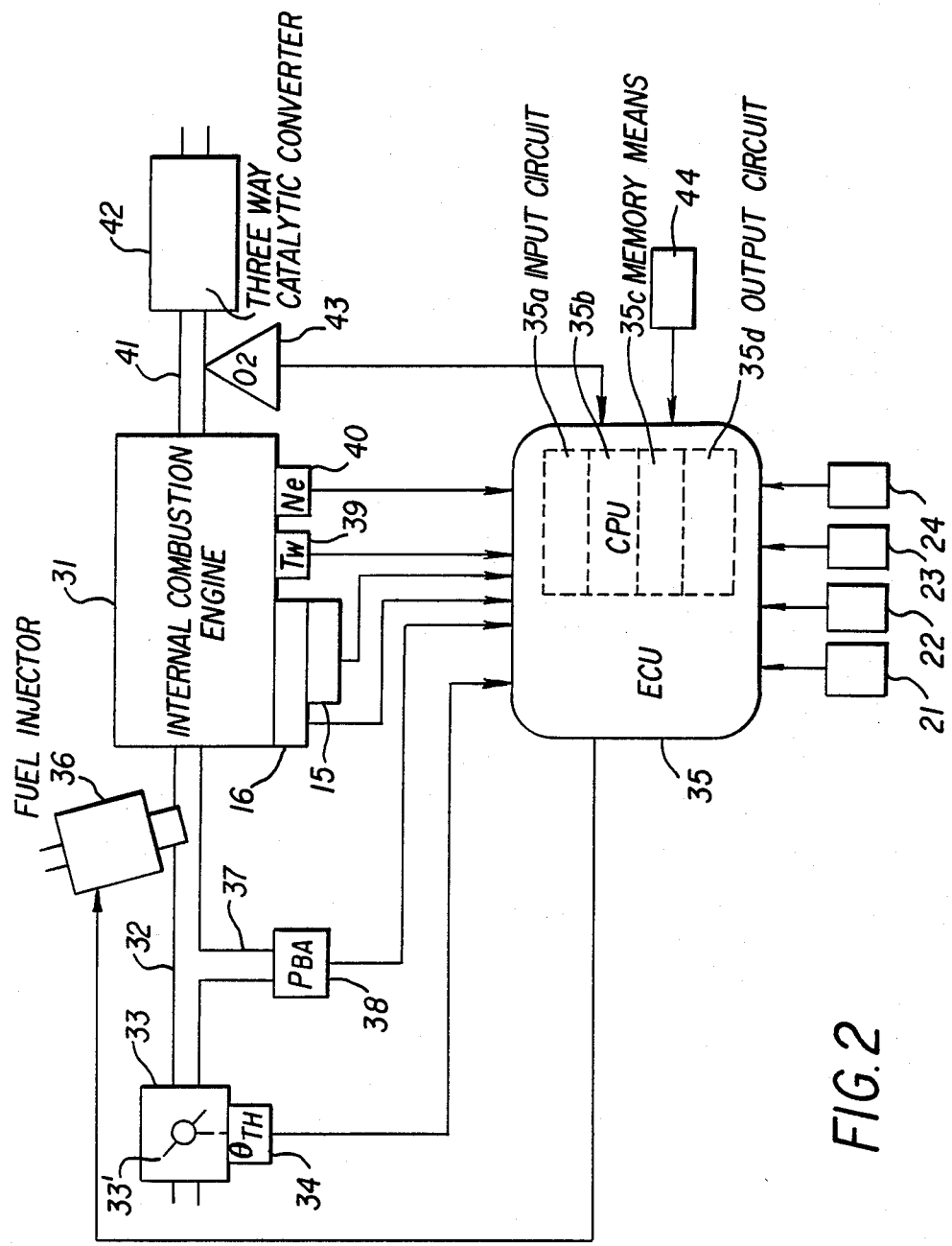
FIG. 2 is a schematic illustration of the fuel supply control device as a driving wheel torque control device.

Referring to FIG. 2 which shows the general structure of the fuel supply control device, reference numeral 31 designates an internal combustion engine having four cylinders, for example. Of course, the system would be operable on any type of engine. An intake manifold 32 is connected to the engine 31. A throttle body 33 is positioned in intake manifold 32. The throttle body 33 includes a throttle valve 33'. The throttle valve 33' is provided with a throttle valve opening ($\theta_{TH}$) sensor 34 for converting the valve opening of the throttle valve 33' to an electrical signal, which is fed to ECU 35.

Fuel injection valves 36 are positioned in intake manifold 32, for respective cylinders, between engine 31 and throttle body 33 at a position just upstream of intake valves (not shown) for respective cylinders. The fuel injection valves 36 are connected to a fuel pump not shown, and are also electrically connected to the ECU 35, so that a valve opening time of the fuel injection valves 36 may be controlled by signals from ECU 35.

An absolute pressure ($P_{BA}$) sensor 38 positioned downstream of throttle valve 33' and is connected through a pipe 37 to intake manifold 32. The absolute pressure in pipe 37 is converted by sensor 38 to an electrical signal, which is fed to ECU 35.

An engine coolant temperature sensor (hereinafter referred to as a "$T_w$ sensor") 39 is disposed in engine 31 to monitor the temperature of the engine coolant. The $T_w$ sensor 39 consists of a thermistor (or like device) mounted in a peripheral wall of the cylinder of the engine. A detection signal from the $T_w$ sensor 39 is fed to ECU 35. An engine rotational speed sensor (hereinafter referred to as "Ne sensor") 40 is provided at the periphery of a camshaft or a crankshaft, not shown, of the engine. The Ne sensor 40 generates a crank angle position signal (hereinafter referred to as a "TDC (Top Dead Center) signal") at a predetermined crank angle position, for every 180° rotation of the crankshaft of the engine. For example, Ne sensor 40 outputs a TDC signal at a crank angle position before a predetermined crank angle with respect to Top Dead Center (TDC) at the beginning of an intake stroke in each cylinder, and this TDC signal is fed to ECU 35.

A catalytic converter 42 of rhodium is provided in an exhaust pipe 41 from engine 31 to purify HC, CO and NOx in the exhaust gas. An $O_2$ sensor 43 is positioned in the exhaust pipe 41 at a position upstream of the catalytic converter 42. The $O_2$ sensor 43 detects oxygen concentration in the exhaust gas and supplies an $O_2$ concentration signal to ECU 35.

An auxiliary parameter sensor 44 is provided to detect other engine parameters and supply a detection signal relative to the other engine parameters to ECU 35. Furthermore, driving wheel speed sensors 21 and 22 and trailing wheel speed sensors 23 and 24 provide inputs to ECU 35.

ECU 35 includes an input circuit 35a for shaping the input signal waveforms from the various sensors (including the driving wheel speed sensors 21 and 22, the driven wheel speed sensors 23 and 24, the sensor of clutch 15, and the sensor of transmission 16), correcting the voltage levels therefrom to a predetermined level, and converting analog signals to digital signals. ECU 35 further includes a central processing unit (which will be hereinafter referred to as a CPU) 35b, a memory 35c for storing various operation programs and operation results executed in CPU 35b, and an output circuit 35d for supplying a driving signal to fuel injection valve 36.

CPU 35b calculates a fuel injection time $T_{OUT}$ for fuel injection valve 36. Engine parameter signals from the various sensors are supplied through the input circuit 35a every time the TDC signal is input thereto and $T_{OUT}$ is calculated from the following equation:

$$T_{OUT} = T_i \times K_1 + K_2 \quad \text{(IX)}$$

where, $T_i$ is a reference value of the injection time of the fuel injection valve 36, which reference value depends on the engine rotational speed Ne and the absolute pressure $P_{BA}$ in the intake manifold.

$K_1$ and $K_2$ are a correction coefficient and a correction variable, respectively, as calculated in accordance with a predetermined operation expression so as to optimize various characteristics such as starting characteristics, exhaust gas characteristics, fuel consumption characteristics, and acceleration characteristics, according to the operational engine condition as sensed by the engine parameter signals from the aforementioned sensors.

CPU 35b supplies a driving signal to fuel injection valve 36 for opening valve 36 according to the fuel injection time $T_{OUT}$, through the output circuit 35d.

Figure 3A:
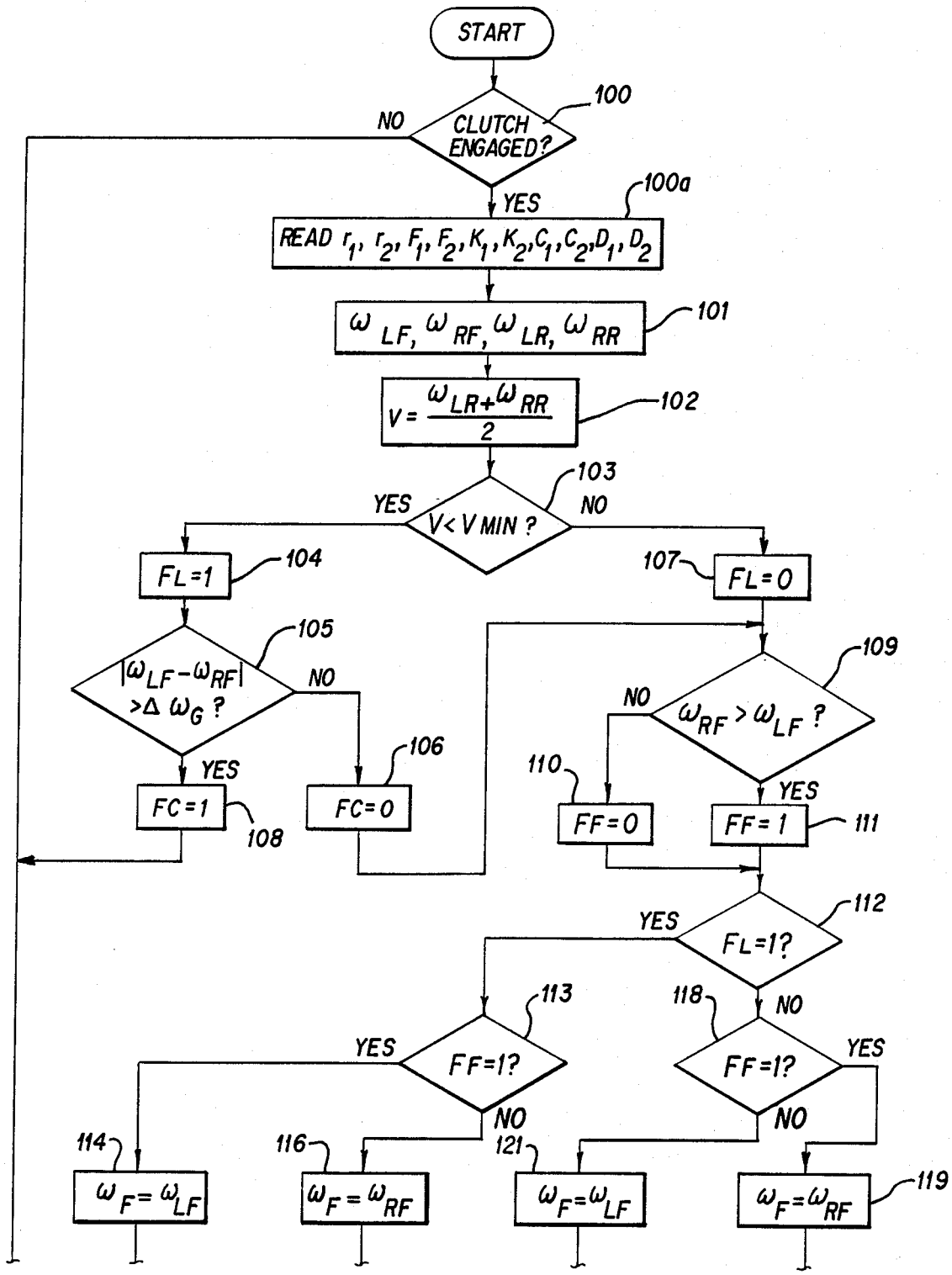
FIGS. 3A and 3B form a flow chart of the slip control program to be executed in ECU 35 of FIGS. 1 and 2.
Figure 3B:
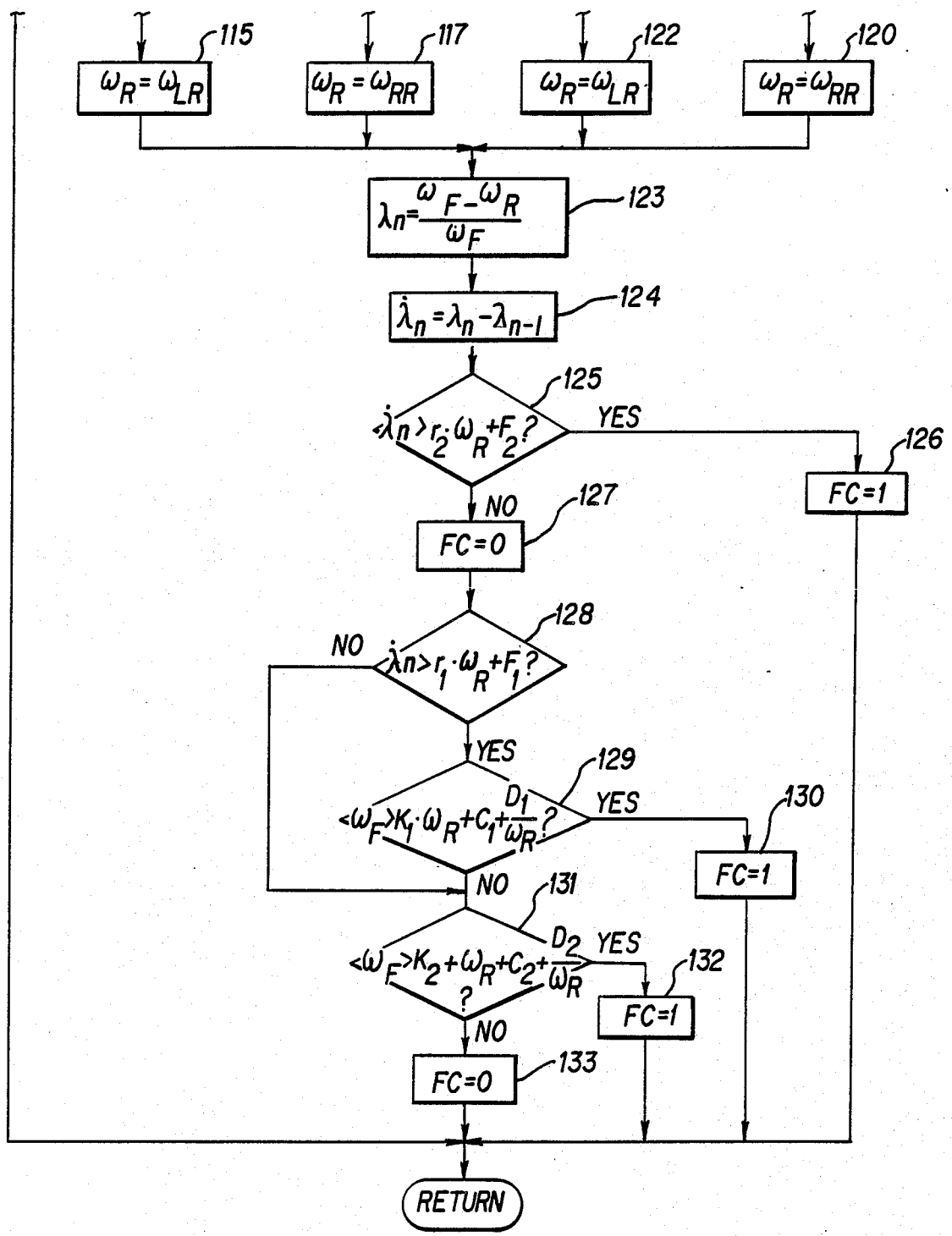

FIG. 3 is a flow chart of a slip control program for the driving wheels of the vehicle according to the present invention. The slip control program is executed every predetermined timer period by the CPU 35b. The program of the flow chart of FIG. 3 should be considered in connection with the structure of FIG. 7.

First, in step 100 it is determined whether or not the clutch is engaged. If it is not engaged, then the program is ended. If it is engaged (i.e., the answer is YES) then the program advances to step 100a, where the constants and values shown in FIG. 3 are read from the setting circuit, and the program advances to step 101. In step 101, the speeds $\omega_{LF}$ and $\omega_{RF}$ of the left and right driving wheels 11 and 12 and the speeds $\omega_{LR}$ and $\omega_{RR}$ of the left and right driven wheels 113 and 14 are read from the corresponding sensors. In step 102, the vehicle speed $V=(\omega_{LR}+\omega_{RR})/2$ is calculated from the average of the left and right driven wheel speeds $\omega_{LR}$ and $\omega_{RR}$.

In step 103, it is determined whether or not the vehicle speed V is lower than the lower limit value $V_{MIN}$. If the answer is YES, the vehicle is at an extremely low speed, and therefore, an extremely low speed flag $F_L$ is set to 1 (step 104). Then, the program proceeds to the following step 105.

In step 105, it is determined whether or not a speed difference ($|\omega_{LF}-\omega_{RF}|$) between the left and right driving wheels 11 and 12 is greater than a predetermined value $\Delta\omega_G$. If the answer is YES, either of the driving wheels is at excessive idling, and therefore, a fuel cut flag FC is set to 1 so as to prevent the excessive idling. Then, the program is ended.

If the answer is NO in step 105, the fuel cut flag FC is reset to 0 (step 106), and then the program proceeds to step 109 described below. If the answer is NO in step 109, the extremely low speed flag $F_L$ is reset to 0 (step 107), and then the program proceeds to step 109.

In step 109, it is determined which of the left driving wheel speed $\omega_{LF}$ and the right driving wheel speed $\omega_{RF}$ is greater (For example, whether or not $\omega_{RF}>\omega_{LF}$). The result of determination in step 109 is stored in a driving wheel high flag $F_F$ (step 110 or 111). The driving wheel high flag $F_F$ is set to 1 if the right driving wheel speed $\omega_{RF}$ is greater than the left driving wheel speed $\omega_{LF}$, while it is set to 0 if the latter $\omega_{LF}$ is greater than the former $\omega_{RF}$, for example.

In step 112, it is determined whether or not the extremely low speed flag $F_L$ is set to 1. If the answer is YES, the lower one of the driving wheel speeds and the speed of the trailing wheel on the same side as the driving wheel having the lower speed are used for the calculation of the slip rate (low select control), thus controlling the torque of the driving wheel generating less slip (steps 113 to 117). That is, in step 113, it is determined whether or not the driving wheel high flag $F_F$ is set to 1 (right). If the answer is YES, the values $\omega_F$ and $\omega_R$ are set to the left driving wheel speed $\omega_{LF}$ and the left driven wheel speed $\omega_{LR}$, respectively, on the opposite side from the side indicated by the flat $F_F$ (steps 114 and 115). If the answer is NO in step 113, the values $\omega_F$ and $\omega_R$ are set to the right driving wheel speed $\omega_{RF}$ and the right driven wheel speed $\omega_{RR}$, respectively, on the opposite side from the side indicated by the flag $F_F$ (steps 116 and 117).

On the other hand, if the answer is NO in step 112, the higher one of the driving wheel speeds and the speed of the trailing wheels on the same side as the driving wheel having the higher speed are used for the calculation of the slip rate $\lambda$ (high select control), thus controlling the torque of the driving wheel generating greater slip (steps 118 to 122). That is, in step 118, it is determined whether or not the driving wheel high flag $F_F$ is set to 1 (right). If the answer is YES, the values $\omega_F$ and $\omega_R$ are set to the right driving wheel speed $\omega_{RF}$ and the right driven wheel speed $\omega_{RR}$, respectively, on the same side as indicated by the flag $F_F$ (steps 119 and 120). If the answer is NO in step 118, the values $\omega_F$ and $\omega_R$ are set to the left driving wheel speed $\omega_{LF}$ and the left driven wheel speed $\omega_{LR}$, respectively, on the same side as indicated by the flag $F_F$ (steps 121 and 122).

Then, in step 123, a slip rate $\lambda_n = (\omega_F - \omega_R)/\omega_F$ at the present loop is calculated from the value $\omega_F$ and $\omega_R$ as set forth above. In step 124, a slip rate differential $\lambda^{\bullet}_n$ is calculated from a difference between the slip rate $\lambda_n$ at the present loop and a slip rate $\lambda_{n-1}$ at the previous loop.

In steps 125, 126, and 127, the aforementioned control processing of prevention of the excess differential slip rate speed is carried out. That is, it is determined whether or not the slip rate variation $\lambda^{\bullet}_n$ is greater than the differential reference value $\lambda^{\bullet}_2 = r_2 \cdot \omega_R + F_2$ (step 125). If the answer is YES, the fuel cut flag FC is set to 1 (step 126). Then, the program is ended. If the answer is NO in step 125, the flag FC is reset to 0 (step 127). Then, the program proceeds to the following step 128.

In steps 128, 129, and 130, the afore-mentioned prediction control processing of the slip is carried out. That is, it is determined whether or not the slip rate variation $\lambda^{\bullet}_n$ is greater than the differential reference value $\lambda^{\bullet}_1 = r_1 \cdot \omega_R + F_1$ (step 128). If the answer is YES, it is determined whether or not the driving wheel speed $\omega_F$ to be controlled is greater than the predetermined speed $V_{R1} 32 k_1 \cdot \omega_R + C_1 + D_1/\omega_R$ (step 129). If the answer is also YES, the fuel cut flag FC is set to 1 (step 130). Then, the program is ended.

Figure 5:
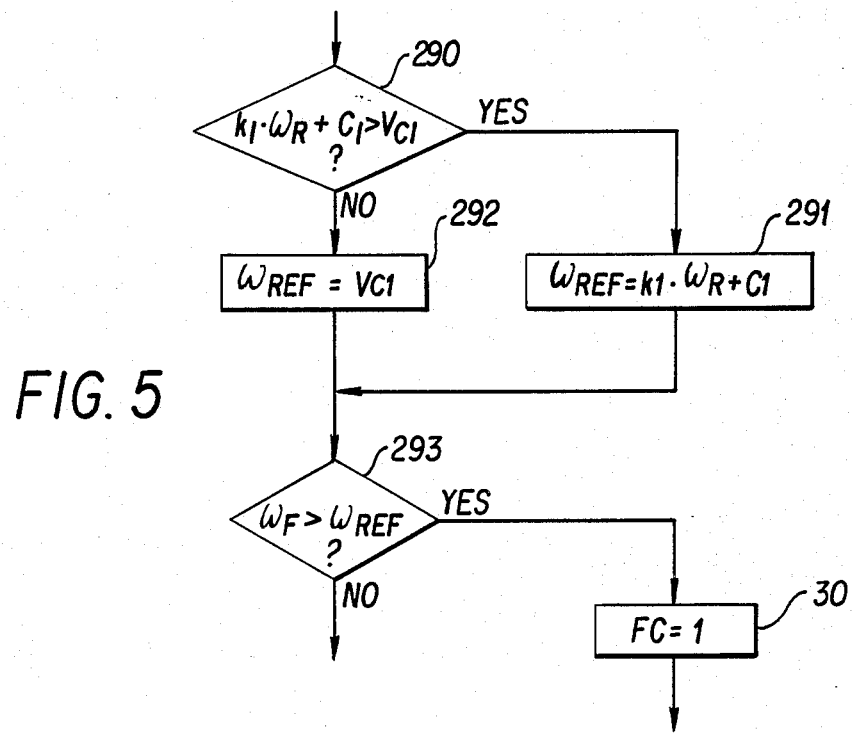
FIG. 5 is a flow chart of another embodiment of the determination in step 29 of the flow chart in FIG. 3.

Referring to FIG. 5, a program of steps 290, 291, 292, and 293 may be substituted for the determination in step 129. In this case, it is determined whether or not the predetermined speed $V_{R1}=k_1 \cdot \omega_R + C_1$ is greater than the reference value $V_{C1}$ (5 km/h, for example) (step 290). If the answer is YES, the value $\omega_{REF}$ is set to the predetermined speed $V_{R1}=K_1 \cdot \omega_R + C_1$ (step 291). If the answer is No in step 290, the value $\omega_{REF}$ is set to the reference value $V_{C1}$ (step 292). Then, it is determined whether or not the driving wheel speed $\omega_F$ to be controlled is greater than the value $\omega_{REF}$ (step 293). If the answer is NO in step 128 or 129, the program proceeds to the following step 131.

In steps 131, 132, and 133, the afore-mentioned control processing of prevention of the excess slip rate is carried out. That is, it is determined whether or not the driving wheel speed $\omega_F$ to be controlled is greater than the predetermined speed $V_{R2}=k_2 \cdot \omega_R + C_2 + D_2/\omega_R$ (step 131). If the answer is YES, the fuel cut flag FC is set to 1 (step 132). Then, the program is ended. Further, the determination in steps 290, 291, 292, and 293 may be substituted for the determination in step 131. In this case, the constants $k_2$, $C_2$ and $V_{C2}$ are naturally substituted for the constants $k_1$, $C_1$, and $V_{C1}$. If the answer is NO in step 131, the flag FC is reset to 0 (step 133). Then, the program is ended.

Figure 4:
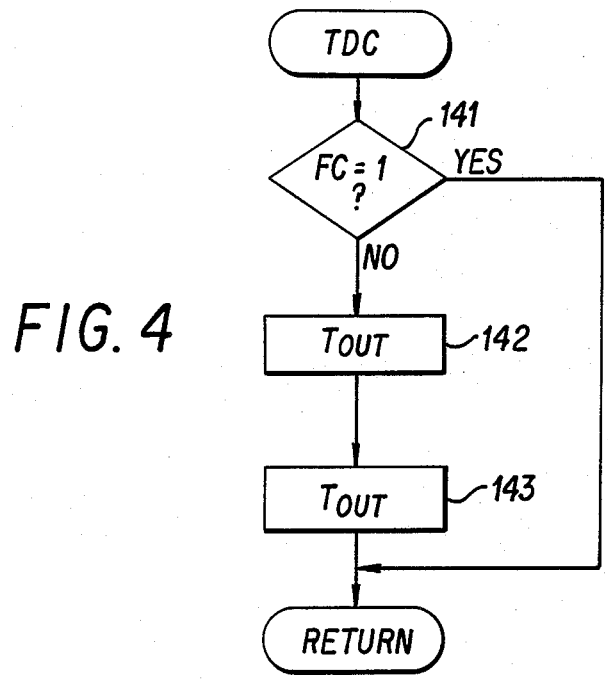
FIG. 4 is a flow chart of the fuel supply control program.

FIG. 4 shows a flow chart of a fuel supply control program, which is executed by the CPU 35b every time the TDC signal is generated. This program is executed in preference over the program shown in FIG. 3. Namely, the program of FIG. 4 is so executed as to interrupt the processing of the program of FIG. 3.

In step 141, it is determined whether or not the fuel cut flag FC, to be set or reset in the program of FIG. 3, is set to 1. If the answer is YES, it means that the fuel cut is to be executed, and therefore, the program is ended at once. If the answer is NO in step 141, the valve opening time $T_{OUT}$ of the fuel injection valve is computed (step 142), and then a valve opening driving signal according to the value $T_{OUT}$ is output (step 143). Then, the program is ended.

As described above, the program for controlling the instant traction control system includes the steps of detecting speeds of left and right driving wheels of the vehicle and speeds of left and right driven wheels, detecting excess slip of the left and right driving wheels according to the speeds of the left and right driven wheels, and limiting slip of the driving wheels of the vehicle upon detection of the excess slip, wherein the excess slip of one of the left and right driving wheels is detected according to the speed of the driven wheel on the same side as the selected one of the left and right driving wheels, and the slip of the driving wheels of the vehicle is limited upon detection of the excess slip of the one of the left and right driving wheels. Accordingly, an apparent slipping during the turning of the vehicle may be reduced to thereby ensure more precise detection of the slip rate. Thus, proper slip control may be carried out.

Figure 7:
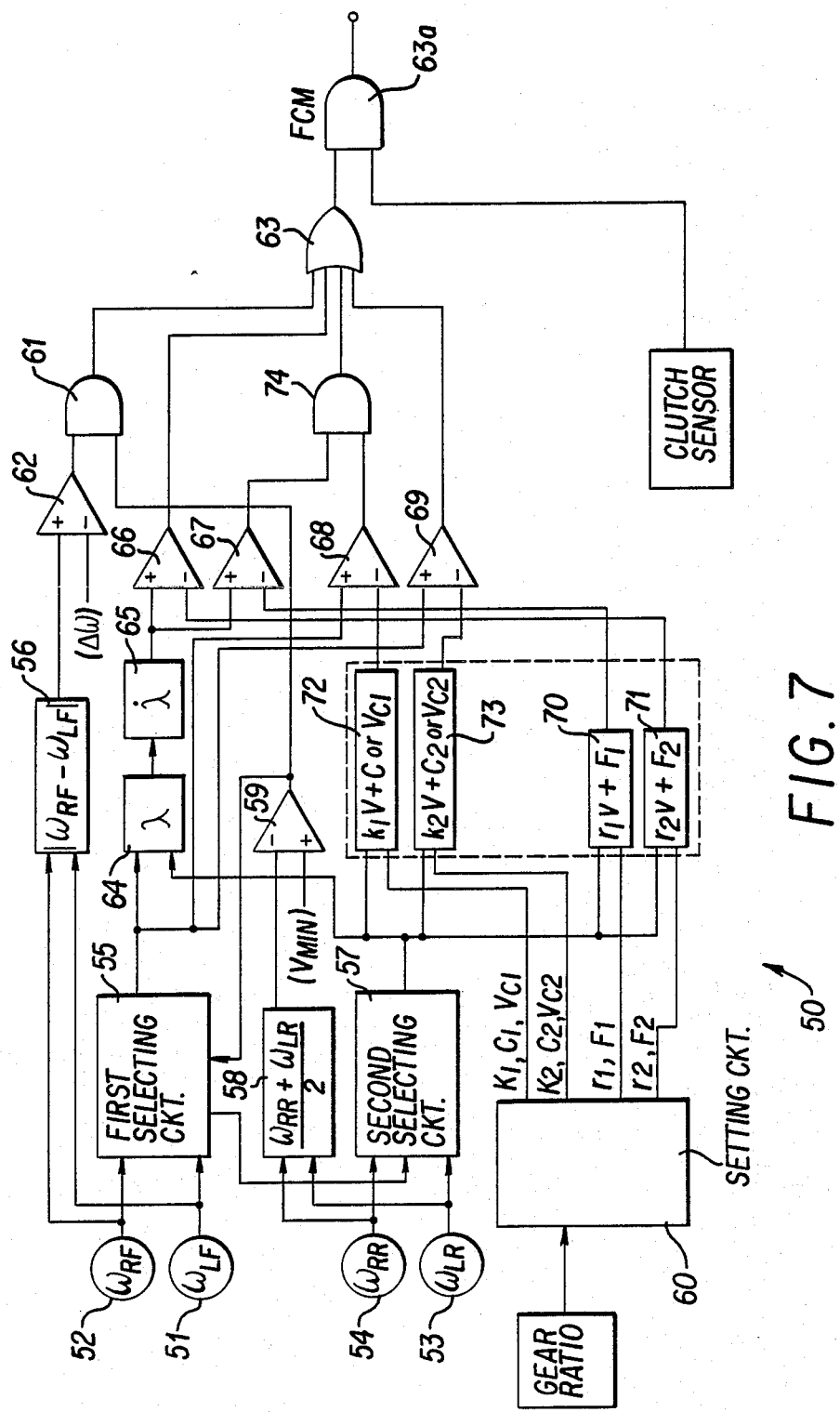
FIG. 7 is a schematic diagram of a logic circuit of the ECU of FIG. 2.

FIG. 7 is a schematic diagram of a control circuit 50 showing the configuration of part of CPU 35b of FIG. 2. This diagram represents a four wheel vehicle of FIG. 1 having front wheel drive. Thus the front wheels are the driving wheels and the rear wheels are the trailing wheels. Inputs 51-54 receive the wheel speed signals $\omega_{LF}$, $\omega_{RF}$, $\omega_{LR}$, $\omega_{RR}$, respectively, from respective wheel speed sensors 21-24. Inputs 51 and 52 input the wheel speed signals from the front wheels into first selecting circuit 55, which outputs a driving wheel speed signal. Inputs 51 and 52 from the front wheel speed sensors are also applied to the wheel speed difference circuit 56 which will be described later.

Inputs 53 and 54 input each rear wheel speed signal from the rear wheel sensors to second selecting circuit 57. The second selecting circuit 57 then outputs a vehicle speed signal. Inputs 53 and 54 are also applied to arithmetic circuit 58. Arithmetic circuit 58 averages the right side trailing wheel speed signal $\omega_{RR}$ from sensor 24 with the left side trailing wheel speed signal $\omega_{LR}$ to arrive at an average speed of the two trailing wheels.

Arithmetic circuit 58 outputs an average speed of the rear wheels to low speed comparator 59. The average speed is input into the negative input of low speed comparator 59. A reference voltage ($V_{MIN}$) is applied to the positive input of comparator 59. The reference voltage $V_{MIN}$ is determined so that comparator 59 detects whether the average speed of the trailing wheels from arithmetic circuit 58 is above a predetermined speed, for example about 2.5 MPH. If the average speed from arithmetic circuit 58 is less than about 2.5 MPH, then comparator 59 will have a HI output. When the average speed from arithmetic circuit 58 is more than about 2.5 MPH, comparator 59 has a LO output. Thus, when the average speed from the arithmetic circuit 58 is detected to be less than 2.5 MPH, comparator 59 has a HI output and when the speed is more than about 2.5 MPH, the comparator 59 outputs a LO output. The output from comparator 59 is applied to first selecting circuit 55 as well as AND gate 61.

As stated above, second selecting circuit 57 outputs a vehicle speed signal. This vehicle speed signal may be generated in several ways, and will be further described below. However, it is also contemplated that the vehicular speed may be detected by other means. For example, the vehicular speed V might be determined based on the phase difference between an output wave of an ultrasonic device and a sensed wave reflected from the road.

A setting circuit 60 is provided which outputs predetermined values and coefficients used in calculations described below. The predetermined values set in setting circuit 60 depend on the specific vehicle using the instant traction control system. The predetermined values set in the setting circuit 60 are generally determined by emperical studies. Also, an input from the transmission may be supplied to the setting circuit 60 so that the predetermined values may also depend on the gear ratio of the transmission. The predetermined values may be stored in a ROM (read only memory) in setting circuit 60, and may be stored in the form of a map.

Wheel speed difference circuit 56 finds the difference between the right side driving wheel speed $\omega_{RF}$ and the left side driving wheel speed $\omega_{LF}$. It takes the absolute value of this difference and outputs it to the positive input terminal of difference comparator 62. A reference voltage (representing a minimum difference in the speeds of the left and right driving wheels) is input to the negative terminal of difference comparator 62. When the difference between the wheel speeds from wheel speed difference circuit 56 exceeds the minimum difference $\Delta\omega$, difference comparator 62 outputs a high signal to AND gate 61. Since the outer input to AND gate 61 is provided from comparator 59, which outputs a HI signal only when the vehicle speed is less than 2.5 MPH, AND gate 61 will turn ON and transmit a fuel cut signal to OR gate 63 only when the speed of the vehicle is below 2.5 miles per hour and the difference in speed between the driving wheels is greater than $\Delta\omega$.

The output of OR gate 63 is applied to an input of AND gate 63a. The other input of AND gate 63a is supplied from the clutch sensor. When the clutch is disengaged, a LO signal is supplied to AND gate 63a, thus inhibiting the output of any full cut signal from the circuit. When the clutch is engaged, a HI signal is applied to AND gate 63a, thus allowing any fuel cut signal from OR gate 63 to be output.

Having described the common portions, the control circuit 50 of FIG. 7 can generally be divided into three different operational portions. The first portion is the excessive $\lambda^\bullet$ portion (where $\lambda^\bullet$ is the differential value of the slip rate $\lambda$), the second portion is the prediction control portion, while the third portion is the excessive $\lambda$ portion (where $\lambda$ is the slip rate as indicated above in equations I or II). Outputs from the first selecting circuit 55 (representing the driving wheel speed signal) and from the second selecting circuit 57 (representing the vehicle speed signal) are applied to slip rate calculating circuit 64. The slip rate calculating circuit 64 calculates the slip rate $\lambda$ based on equations I or II set forth above. The output of slip rate calculating circuit 64 is then input to differentiating circuit 65. The differentiating circuit 65 calculates the differential value of the slip rate.

The excessive $\lambda^\bullet$ portion of the circuit is illustrated when an output from the differentiating circuit 65 is applied to the excessive $\lambda^\bullet$ decision circuit (or first comparison circuit 66). The input from differentiating circuit 65 is applied to the positive terminal of comparator circuit 66. The predetermined value setting circuit 60 which provides predetermined values to be used as reference or comparison values, supplies said values to reference determination circuit 71. Also, an output from second selecting circuit 57, representing the vehicle speed signal is also applied to reference determination circuit 71. Reference determination circuit 71 calculates a differential reference value, and outputs that differential reference value to the negative input of first comparison circuit 66. The output of comparison circuit 66 is then applied to OR gate 63.

The prediction control portion of the circuit of FIG. 7 includes first prediction control decision circuit (or second comparison means) 67 and second prediction control decision circuit (or third comparison means) 68. The outputs of comparison circuits 67 and 68 are applied to AND gate 74, and the output of AND gate 74 is applied to OR gate 63. Specifically, the positive input of the second comparison circuit 67 receives the output of differentiating circuit 65. The negative input of comparison circuit 67 receives the output of reference determination circuit 70 which in turn receives an input from the setting circuit 60 and another input, representing the vehicle speed signal, from second selecting circuit 57.

The positive input of third comparison circuit 68 is received from the output of first selecting circuit 55 and represents the wheel speed of the selected wheel. The negative input of third comparison circuit 68 is received from the output of reference generating means 72. Reference generating circuit 72 receives one input from second selecting circuit 67, representing the vehicle speed signal, and another input from setting circuit 60. Reference generating circuit 72 selects the larger of a calculated reference value represented by the equation $V_{R1} = K_1 V + C_1$, or the value $VC_1$ (determined by the setting circuit 60) and supplies the larger of the two values as a speed reference value to third comparison circuit 68.

The excessive $\lambda$ portion of the circuit includes an excessive $\lambda$ decision circuit (or fourth comparison means 69). The output of fourth comparison circuit 69 is also applied to OR gate 63. The positive input of fourth comparison circuit 69 is supplied from the output of first selecting circuit 55. The negative input of comparison circuit 69 is supplied from reference generating means 73. Reference generating means 73 receives one input from second selecting circuit 57, representing the vehicle speed signal, and another input from setting circuit 60. The reference generating circuit 73 provides the larger of two values as a speed reference value to comparison circuit 69. The first value is determined in accordance with the following equation:

$$V_{R2} = K_2 V + C_2$$

and the second value is a constant level signal $VC_2$. Reference generating means 73 selects the larger of these two values as the speed reference value for fourth comparison circuit 69.

In operation, the circuit of FIG. 7 operates as follows. The inputs from wheel sensors 21 and 22 are transmitted to first selecting circuit 55 through inputs 51 and 52, respectively. First selecting circuit 55, based on the inputs, $\omega_{RF}$ and $\omega_{LF}$, selects one of those signals as a driving wheel speed signal as determined by low speed comparator 59. If the vehicle speed as determined by arithmetic circuit 58 is lower than about 2.5 MPH, then a HI level is output to first selecting circuit 55, which chooses the low speed signal as the driving wheel speed signal. If the vehicle speed is greater than about 2.5 MPH, low speed comparator 59 outputs a LO signal to first selecting circuit 55 which then chooses the high speed signal as the driving wheel speed signal.

The speed signals representing $\omega_{LR}$ and $\omega_{RR}$ from sensors 23 and 24 are input to second selecting circuit 57 and arithmetic circuit 58 through inputs 53 and 54, respectfully. As stated above, arithmetic circuit 58 averages the speed of the two trailing wheels for the low speed comparator 59. An input is provided from the first selecting circuit 55 to the second selecting circuit 57. As also set forth above, selecting circuit 57 outputs a vehicle speed signal. Second selecting circuit 57 selects either $\omega_{LR}$ or $\omega_{RR}$ as the vehicle speed signal. The input to circuit 57 from circuit 55 indicates which wheel is selected by selecting circuit 55 for the driving wheel speed signal. Then, second selecting circuit 57 chooses the wheel on the same side of the vehicle as the chosen wheel in selecting circuit 55 for providing the vehicle speed signal. In other words, if first selecting circuit 55 selects $\omega_{RF}$ as the driving wheel speed signal, then second selecting circuit 57 will select $\omega_{RR}$ as the vehicle speed signal.

The wheel speed difference circuit 56, along with difference comparator 62 and AND gate 61 are described above. Briefly, these components serve to prevent wheel slip between the driving wheels at speeds below about 2.5 MPH. Since the output from low speed comparator 59 is applied to AND gate 61, AND gate 61 will only function when the vehicle speed is below about 2.5 MPH. Wheel speed difference circuit 56 detects a difference between $\omega_{RF}$ and $\omega_{LF}$, the right and left front wheel speed signals. When the differences in $\omega_{RF}$ and $\omega_{LF}$ exceeds the predetermined difference $\Delta\omega$, then difference comparator 62 outputs a HI signal and so does AND gate 61 (when the vehicle speed is less than about 2.5 MPH) and thus a fuel cut signal is output from OR gate 63, and if the clutch is engaged, then a HI signal will be output from AND gate 63a.

Slip rate calculating circuit 64 receives inputs from first selecting circuit 55 (representing the driving wheel speed signal) and from second selecting circuit 57 (representing the vehicle speed signal). Slip rate calculating circuit then calculates the value $\lambda$ in accordance with equations I or II set forth above. The output of circuit 64 is input to differentiating circuit 65. Differentiating circuit 65 takes the differential of $\lambda$ and outputs a differential slip rate ($\lambda^\bullet$).

The predetermined value setting circuit 60 sets lower speed value coefficient $K_1$, constant $C_1$, and constant $V_{C1}$, and upper speed value coefficient $K_2$, constant $C_2$, and constant $V_{C2}$. Further, the setting circuit 60 also sets coefficient $r_1$ and constant $F_1$ as well as coefficient $r_2$ and constant $F_2$.

When the excessive $\lambda\bullet$ decision circuit (or first comparison circuit 66) determines that the differential value $\lambda^\bullet$. of the slip rate is larger than the differential reference value determined by reference determination circuit 71 by comparing the output signal from differentiating circuit 65 with the output of reference determination circuit 71, the comparison circuit 66 outputs a HI level signal to OR gate 63. When the differential slip rate $\lambda^\bullet$ is less than the differential reference value from reference determination circuit 71, then first comparison circuit 66 outputs a LO signal and thus does not enable OR gate 63 to output a fuel cut signal. Thus, when the slip rate $\lambda$ increases rapidly, the differential value $\lambda^\bullet$ becomes large. When the differential slip rate $\lambda^\bullet$ becomes large and exceeds the differential reference value from reference determination circuit 71, then a fuel cut signal is output to prevent excessive differential slip rate.

First prediction control decision circuit (or second comparison circuit) 67 outputs a HI signal to AND gate 74 when it determines that the differential value $\lambda^\bullet$ of the slip rate is larger than the differential reference value from reference determination circuit 70. Otherwise, second comparison circuit 67 outputs a LO signal.

Additionally, first reference generating circuit 72 calculates a reference $V_{R1}$ based on a correction coefficient $K_1$ and a correction constant $C_1$ which are stored in setting circuit 60, which may be a ROM (Read Only Memory) associated with ECU 35. Values $K_1$ and $C_1$ may be selected as a function of the gear ratio. First reference generating circuit 72 also receives constant $V_{C1}$ from setting circuit 60. Circuit 72 then calculates a first reference value $V_{R1}$ from the following equation:

$$V_{R1} = K_1 V + C_1 \tag{IV}$$

Figure 8:
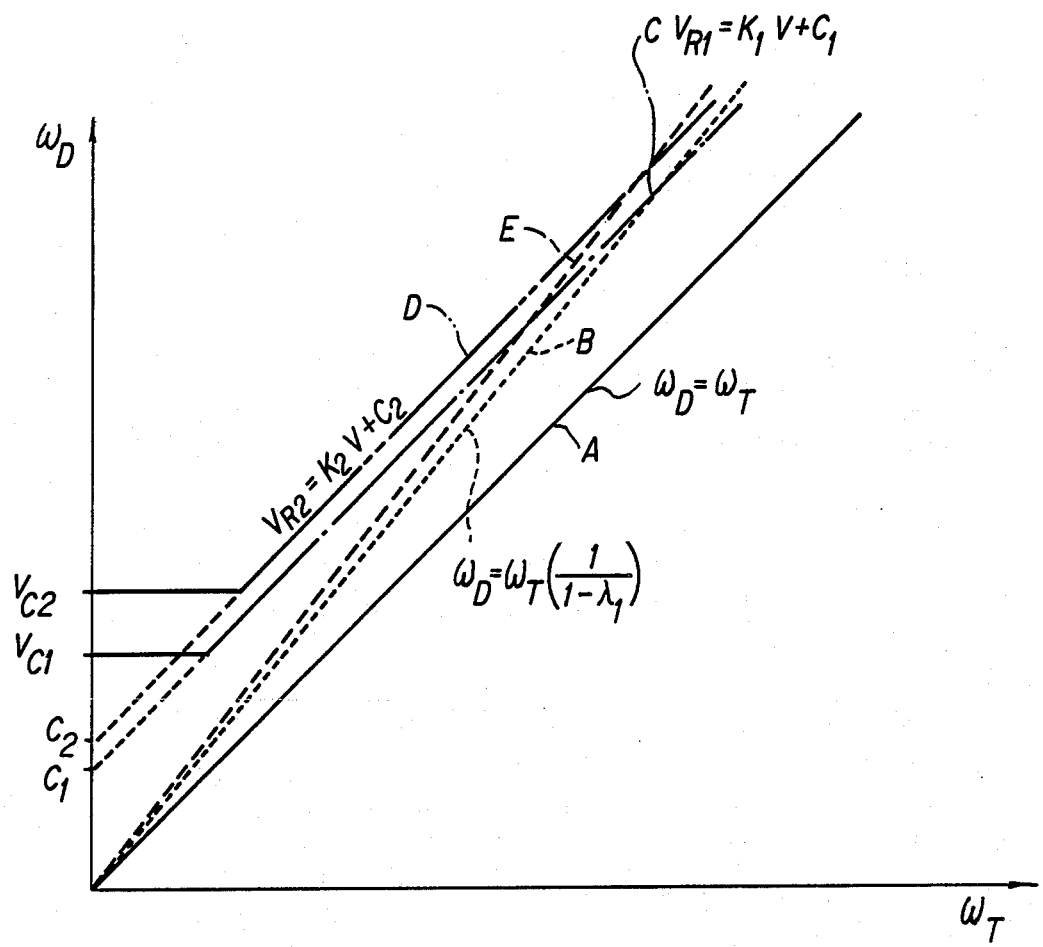
FIG. 8 is a graph showing the trailing wheel speed versus the driving wheel speed.

Generating circuit 72 then compares $V_{R1}$ and $V_{C1}$ and outputs the larger of the two as a predetermined speed reference value. (The values for $V_{R1}$, $V_{C1}$, $V_{R2}$ and $V_{C2}$ are illustrated in FIG. 8, described below.)

Here, values which satisfy the equation $\lambda_1 = (V_{R1} - V)/V_{R1}$ are set for constants $K_1$ and $C_1$. The second prediction control decision circuit (or third comparison circuit) 68 outputs a HI signal to AND gate 74 when it determines that the driving wheel speed signal $V_w$ is larger than the first predetermined speed reference value from generating circuit 72. When the driving wheel speed is not greater than the predetermined speed reference value from generating circuit 72, then comparison circuit 68 outputs a LO signal. Because the outputs from the first and second prediction control decision circuits 67 and 68 are input to AND gate 74, both must have a HI signal in order for AND gate 74 to output a HI signal, thus causing OR gate 63 to output a fuel cut signal.

Thus when the driving wheel speed signal $V_w$ and the differential slip rate $\lambda^\bullet$ are both greater than their respective reference values, then the prediction control circuit operates.

Furthermore, reference generating circuit 73 calculates a reference value $V_{R2}$ based upon a correction coefficient $K_2$ and a correction variable $C_2$ which are stored in setting circuit 60. Generating circuit 73 also receives the vehicle speed V from second selecting circuit 57. It then calculates reference value $V_{R2}$ from $K_1$, $C_1$ and vehicular speed V from the following equation where constants $K_2$ and $C_2$ are set in the same manner as $K_1$ and $C_1$:

$$V_{R2} = K_2 V + C_2$$

Generating circuit 73 then compares the value $V_{R2}$ with a constant value $V_{C2}$ and selects the larger of the two and outputs that value as a second predetermined speed reference value. Constant values $V_{C1}$ and $V_{C2}$ are best illustrated in FIG. 8. These constants are selected since it is difficult to detect and control wheel slip at low speeds. These values are determined by emperical testing and vary from one type of vehicle to another.

The excessive $\lambda$ decision circuit (or fourth comparison circuit) 69 outputs a HI signal to OR gate 63 when it determines that the driving wheel speed $V_w$ from first selecting circuit 55 is larger than the second predetermined speed reference value from reference generating circuit 73. Thus, when comparator 69 outputs a HI signal, it causes OR gate 63 to output a HI signal or a fuel cut signal. Therefore the prevention of excessive slip rate is achieved by issuing a fuel cut signal when the slip rate $\lambda$ is larger than a predetermined value.

Further, it is preferable that computed values are read out of a $V - V_{R1}$ table and a $V - V_{R2}$ table which are stored in advance in memory means 35c instead of calculating first and second predetermined values $V_{R1}$ and $V_{R2}$ by multiplication and addition by generating circuits 72 and 73 based on equations IV and V everytime the control is performed. This reduces the processing time, which improves the response characteristics of the slip rate control.

FIG. 8 is a graph of the driving wheel speed ($\omega_D$) versus the trailing wheel speed ($\omega_T$). Line A indicates the condition where there is no slip. In other words, line A shows the condition where the driving wheel speed is equal to the trailing wheel speed:

$$\omega_D = \omega_T \tag{VI}$$

Line B illustrates a theoretical condition for prediction of slip where:

$$\omega_D = \omega_T \left( \frac{1}{1 - \lambda_1} \right) \tag{VII}$$

this is derived from equation II which can be summarized as:

$$\lambda_1 = \frac{\omega_D - \omega_T}{\omega_D} \tag{VIII}$$

$$1 - \lambda_1 = \frac{\omega_T}{\omega_D} \tag{IX}$$

$$\omega_D = \omega_T \left( \frac{1}{1 - \lambda_1} \right) \tag{VII}$$

However, speed reference values from the generating circuits 72 and 73 are determined in accordance with lines C and D, respectively. Line C represents equation IV:

$$V_{R1} = K_1 C + C_1 \tag{IV}$$

Wherein, $C_1$, as set forth above, is selected in order to overcome practical difficulties in actually detecting slip at low speeds. $K_1$ is selected so that line C intersects theoretical line B at a predetermined speed. Line C, which approximates theoretical line B at higher speeds, is therefore used to produce the reference value $V_{R1}$. The constant value $V_{C1}$ is also set in order to avoid the difficulties in detecting actual slip at low speeds.

Line D is also determined similarly to line C and is used to produce the reference value $V_{R2}$, which would approximate a theoretical value of $\omega_D$ as a function of $\omega_T$ as indicated by line E. Thus, as shown, line D represents equation V:

$$V_{R2} = K_2 V + C_2 \tag{V}$$

Also, constant value $V_{C2}$ is set in order to avoid difficulties in detecting actual slip at low speed.

FIGS. 9A, 9B, and 9C all vary with respect to time. The time t is set forth on the horizontal axis. FIG. 9A specifically compares the driving wheel speed $\omega_D$ (also considered to be $V_w$) versus time t. FIG. 9B illustrates the differential slip rate ($\lambda^\bullet$) versus time t. FIG. 9C illustrates the slip rate $\lambda$ versus time t. FIG. 9C is employed in an alternate embodiment of the invention described below. The horizontal axes of FIGS. 9A, 9B, and 9C are all equal, and therefore the figures may be compared directly with one another.

Therefore, FIG. 9A is a graph of the driving wheel speed $\omega_D$ as a function of time. The driving wheel speed $\omega_D$ is indicated on the vertical axis and the time t is indicated on the horizontal axis. The solid curve actually relates to the speed of the driving wheel speed $\omega_D$. The dotted line relates to the speed of the vehicle V or trailing wheel speed $\omega_T$.

Essentially, double dotted line 1A represents the output of reference generating circuit 73, while single dotted line 2A represents the output level of reference generating circuit 72. It will be noted that the sloped portions of lines 1A and 2A correspond with values $V_{R2}$ and $V_{R1}$, respectively. The level portions of lines 1A and 2A correspond to values $V_{C2}$ and $V_{C1}$ respectively (see also FIG. 8).

FIG. 9B represents the differential slip rate $\lambda^\bullet$ (vertical axis) with respect to time (horizontal axis). The solid curve represents the differential slip rate $\lambda^\bullet$. In the lower portion of FIG. 9B, a fuel cut (F/C) signal is illustrated which is indicated in an ON or OFF state. As seen from the figures, the fuel cut signal is derived from FIGS. 9A and 9B, when considered together. The vertical dotted lines extending upward from the fuel cut signal are used to indicate which events cause the fuel cut signal to be turned ON or OFF.

For example, referring to FIG. 9A, the excess $\lambda$ portions are indicated by arrows 75, 76, and 77. This is where the driving wheel speed $\omega_D$ is greater than the output of reference generating circuit 73 (in other words, the speed reference value which is the greater of the values $V_{C2}$ or $V_{R2}$). At the points represented by the arrows 75, 76, and 77, the excess $\lambda$ circuit becomes operative and comparator 69 is turned ON, and thus outputs a HI signal. Thus, OR gate 63 is caused to output a HI signal or a fuel cut signal. Positioned below the curve in FIG. 9A, arrows 78, 79, and 80 represent the portion where the driving wheel speed $\omega_D$ is greater than the output of reference generating means 72 (in other words the greater reference value of $V_{C1}$ or $V_{R1}$). This output from reference generating circuit 72 is used in the prediction control circuit, since it is input to comparator 68. In other words, when considered in connection with FIG. 7, arrows 78, 79, and 80 represent the time when comparator 68 turns on and outputs a HI signal to AND gate 74. However, this is only half of the prediction control circuit. Because the output of comparator 68 is input to AND gate 74, simply the turning on of comparator 68 will not cause the output of a driving wheel slip control signal to reduce torque to the driving wheel.

Therefore, the second part of the prediction control circuit must also be turned on in order to provide a driving wheel slip control signal. Therefore, FIG. 9B must also be considered in connection with FIG. 9A. FIG. 9B, as set forth above, illustrates the differential slip rate $\lambda^\bullet$ with respect to time. It should be noted that the differential reference values $\lambda^\bullet_1$ from reference determination circuit 70 and $\lambda^\bullet_2$ from determination circuit 71 are indicated on the vertical axis. Specifically, in FIG. 9B, solid arrows 81, 82, and 83 represent the points where the value of the differential slip rate $\lambda^\bullet$ is greater than the predetermined differential reference value $\lambda^\bullet_1$. In other words, arrows 81, 82, and 83 represent the points where comparator 62 turns on, because the value of the differential slip rate is greater than the predetermined differential reference value $\lambda^\bullet_1$. As with the other half of the prediction control circuit (comparator 68) discussed above, simply the turning on of comparator 67 will not cause the output of a driving wheel slip control signal to reduce the torque to the driving wheels. Therefore, because comparator 67 is also input to AND gate 74, both comparator 67 and 68 must be ON in order for a prediction control signal to be issued. Of course, AND gate 63a must also have a HI level input from the clutch sensor to thus have the driving wheel slip control signal also to be issued. Solid arrows 84, 85, and 86 represent the time periods in which the turning ON of comparators 67 and 68 overlap, thus causing AND gate 74 to turn ON which in turn causes OR gate 63 to issue a driving wheel slip control signal. Thus, both signals from FIGS. 9A and 9B are combined to result in the output of the prediction control circuit.

Arrows 87 and 88 represent the points where the differential slip rate $\lambda^\bullet$ is greater than the predetermined differential reference value $\lambda^\bullet_2$ from reference determination circuit 71. It is at the points of arrows 87 and 88 where comparator 66 of the excessive $\lambda^\bullet$ circuit turns on because the differential value of the slip rate from differentiating circuit 65 is greater than the predetermined differential reference value $\lambda^\bullet_2$ from reference determination circuit 71. At this point, comparator 66 outputs a HI level which causes OR gate 63 to output a driving wheel slip control signal. Thus, arrows 87 and 88 illustrate the operation of the excessive $\lambda^\bullet$ control circuit.

The fuel cut signal shown in the lower portion of FIG. 9B represents the time when a fuel cut signal is turned ON and OFF. In other words, when the fuel cut signal is turned ON the ECU inhibits the opening of fuel injector valve 36. When the fuel cut signal is turned OFF the ECU is allowed to transmit the injection time signals to open and close the fuel injector 36 in accordance with normal engine operation. The fuel cut signal graph relates to the output of OR gate 63, before AND gate 63a. Specifically, at reference numeral 89 the fuel cut signal is turned ON by comparator 66 which is represented by arrow 87 on the differential slip rate graph (this is the excessive $\lambda^\bullet$ circuit). The fuel cut signal is maintained in the on state by prediction control circuit AND gate 74 which is represented by arrow 84 which indicates the ON state of AND gate 74. This indicates the operation of the prediction control circuit. Further, the excess $\lambda$ circuit or comparator 69 maintains the fuel cut signal in the ON state as illustrated by arrow 75. When comparator 69 turns OFF (at the end of arrow 75) the fuel cut signal is turned OFF at reference numeral 90. The fuel cut signal remains OFF until reference numeral 91 indicates that it is turned ON by the excessive $\lambda^\bullet$ circuit represented by arrow 88. This, of course, corresponds to the turning ON of comparator 66. As with the previous fuel cut signal in the ON state, the operation of the prediction control circuit (AND gate 74) is indicated by arrow 85, and the operation of the excess $\lambda$ circuit (comparator 69) is indicated by arrow 76. The fuel cut signal is then turned OFF when the comparator 69 of the excess $\lambda$ circuit is turned OFF as illustrated at the end of arrow 76. Once again, the fuel cut signal is turned ON at reference numeral 93. However, in this case, the prediction control circuit (AND gate 74) turns ON as indicated by arrow 86. The excess $\lambda$ circuit (comparator 69) turns ON as represented by arrow 77 and maintains the fuel cut signal in the ON state. This graph does not further indicate when the fuel cut signal is turned OFF.

FIG. 9C is directed to an alternate embodiment of the invention, which is described below. Therefore, FIG. 9C will be described in detail below.

Additionally, in the above embodiment, a fuel supply control unit is used as a driving wheel torque control unit and the driving torque of the driving wheel 11 and 12 is reduced by cutting the supply of fuel at a predetermined time by the fuel supply control unit. However, other methods may be employed so that the torque of the driving wheels 11 and 12 may be reduced by having the ignition delayed by an ignition timing wheel. Also, as stated above, the torque to the driving wheels may also be reduced by applying brakes to one or both of the driving wheels.

Therefore, as described above, a slip rate control device according to the instant invention has a driving wheel speed sensor means for sensing the speed of the driving wheels and for generating a driving wheel speed signal as a function thereof, and a vehicle speed sensor means for sensing the speed of the vehicle and for generating a vehicle speed signal as a function thereof. Further, a first selecting circuit is included within the driving wheel speed sensor means and is operatively connected to the vehicle speed sensor means, and generates a driving wheel speed signal in response to the vehicle speed signal. Further, a control means is provided which is responsive to the driving wheel speed signal from the first selecting circuit means for controlling the excess slip of the driving wheel by controlling the torque of the driving wheel. A predetermined value setting circuit means is also provided for generating reference values in accordance with the gear ratio of the transmission of the vehicle.

Thus, control of high precision may be achieved when slip of a driving wheel is produced during starting or acceleration in a large horsepower vehicle or at the time of starting or acceleration in a vehicle on a slippery road surface, even due to a change in gear ratio of the transmission, thus resulting in maintenance of maximum friction force between the road surface and wheel. Accordingly, the driving efficiency of the vehicle may be improved and the decrease in lateral force produced by a wheel may be minimized. In other words, the lateral traction of the wheel will be enhanced.

Figure 10:
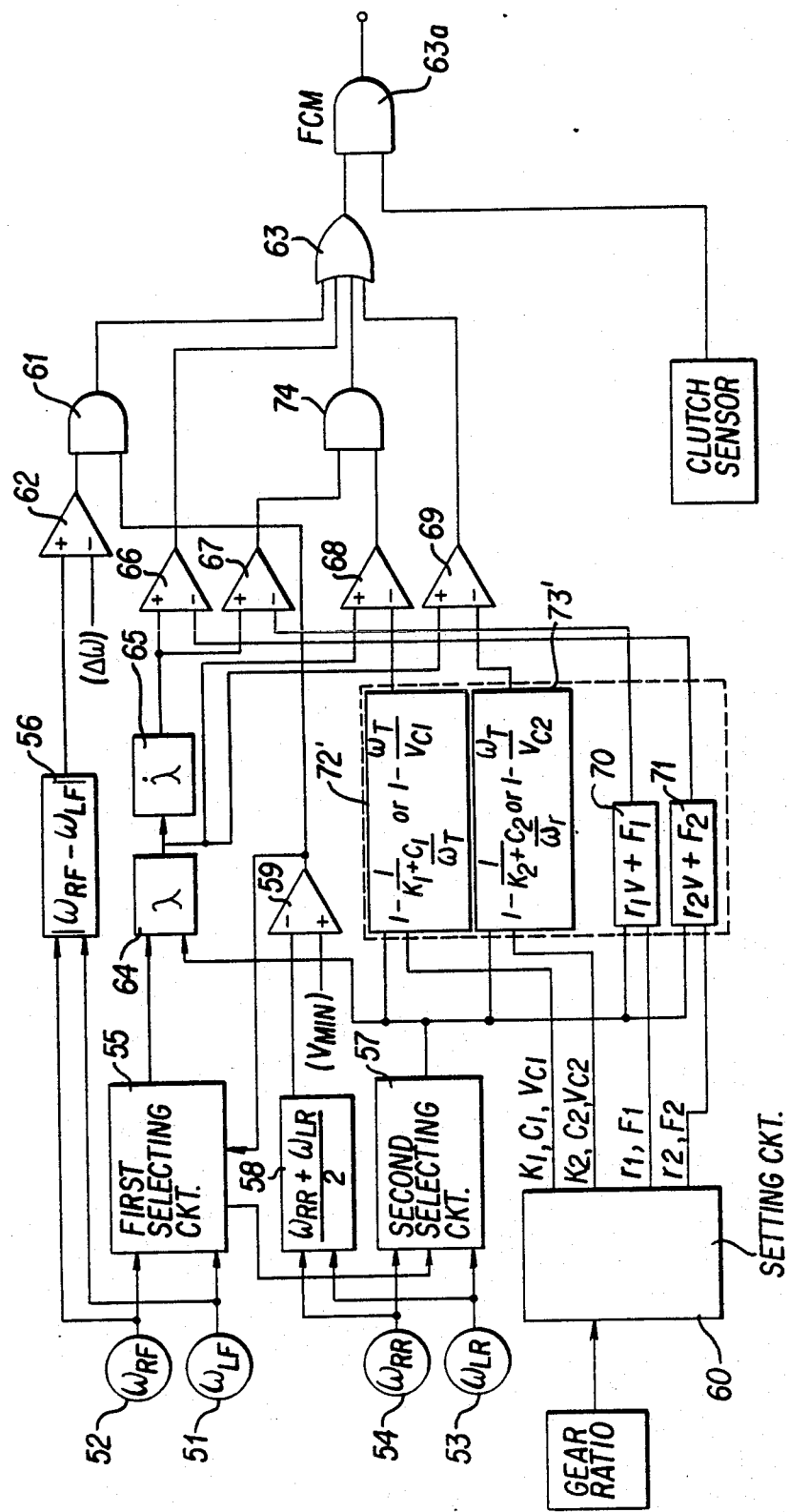
FIG. 10 is a schematic diagram of a second embodiment of a logic circuit of the ECU of FIG. 2.

FIG. 10 illustrates an alternate embodiment of the control circuit of CPU 35b, shown in FIG. 2. Specifically, in the alternate embodiment of FIG. 10, the prediction control portion and the excessive $\lambda$ portion of the circuit compare the slip rate $\lambda$ (calculated in the slip rate calculating circuit 64) with the greater of two calculated reference values rather than comparing the driving wheel speed with calculated reference values as in FIG. 7.

With regard to the prediction control portion of the circuit, the inputs to the first prediction control decision circuit (or second comparison circuit) 67 are the same as in FIG. 7. However, the inputs to the second prediction control circuit (or third comparison circuit) 68 have been altered. Specifically, the positive input to comparator 68 receives the slip rate $\lambda$ from the slip rate calculating circuit 64 rather than a driving wheel speed signal from first selecting circuit 55 (as in FIG. 7).

The negative input of comparator 68 receives the output from first generating circuit 72'. However, the slip rate reference value generated by circuit 72' is different than in the embodiment of FIG. 7. Specifically, generating circuit 72' continues to receive the outputs of setting circuit 60, which include values $K_1$, $C_1$, and $V_{C1}$. The reference value $\lambda_{R1}$ generated by circuit 72' is determined in accordance with the following equation:

$$\omega_{R1} = 1 - \frac{1}{K_1 + \frac{C_1}{V}} \quad \text{(X)}$$

where V is the vehicular speed determined by second selecting circuit 57. Equation X above is derived from the basic equation for $\lambda$:

$$\lambda = \frac{\omega_D - \omega_T}{\omega_D} \quad \text{(XI)}$$

Then, assuming that $\omega_D$, the actual detected driving wheel speed, is equal to $V_{R1}$, the reference speed value, then equation IV can be written as follows:

$$\omega_D = K_1 V + C_1 \quad \text{(XI)}$$

Then substituting equation XII for $\omega_D$ and vehicular speed V for $\omega_T$, equation XI may be written as follows:

$$\lambda_{R1} = 1 - \frac{V}{K_1 V + C_1} \quad \text{(XIII)}$$

which results in equation X:

$$\lambda_{R1} = 1 - \frac{1}{K_1 + \frac{C_1}{V}} \quad \text{(X)}$$

Therefore, the value $\lambda_{R1}$ is determined as a reference value in circuit 72'.

Circuit 72' also calculates a second reference value and outputs the greater of the two as a slip rate reference value. The second reference value $V_{C1}$ is shown by the following equation:

$$\lambda_{VCl} = 1 - \frac{V}{V_{Cl}} \quad \text{(XV)}$$

Where $V_{C1}$ is a constant derived from setting circuit 60, and V is the vehicle velocity from second selecting circuit 57. Equation (XV) is derived as follows. Referring back to the basic equation for $\lambda$:

$$\lambda = \frac{\omega_D - \omega_T}{\omega_D} \quad \text{(I)}$$

Then substituted $V_{C1}$ for $\omega$, since $V_{C1}$ is an analogous quantity, the following equation is reached:

$$\lambda_{VCl} = \frac{V_{Cl} - \omega_T}{V_{Cl}} \quad \text{(XVI)}$$

or $$\lambda_{VCl} = 1 - \frac{\omega_T}{V_{Cl}} \quad \text{(XVII)}$$

and since $\omega_T = V$, $$\lambda_{VCl} = 1 - \frac{V}{V_{Cl}} \quad \text{(XV)}$$

With regard to the excessive λ portion of the circuit, the positive input to the excessive λ decision circuit (or fourth comparison circuit) 69 is received from slip rate calculating circuit 64, rather than from first selecting circuit 55 (as in FIG. 7). In other words, the slip rate λ is provided to the positive input of comparator 69 rather than the driving wheel speed signal being provided to comparator 69 (as in FIG. 7).

The negative input to comparator 69 is received from reference generating circuit 73'. However, as with reference generating circuit 72' (described above), in this alternate embodiment, the slip rate reference value generated by circuit 73' is different than that of the circuit of FIG. 7. Specifically, circuit 73' generates a slip rate reference value which is applied to the negative input of comparator 69. The slip rate reference value from circuit 73', as with circuit 72', is the greater of a reference value $\lambda_{R2}$ and a value $\lambda_{VC2}$. Reference value $\lambda_{R2}$ is determined according to the following equation:

$$\lambda_{R2} = 1 - \frac{1}{K_2 + \frac{C_2}{V}} \quad \text{(XVIII)}$$

where $K_2$ and $C_2$ are values supplied from setting circuit 60, and V is the vehicular speed. The value for $\lambda_{R2}$ is derived in the same manner as the value for $\lambda_{R1}$ explained above.

The value for $\lambda V_{C2}$, also generated by circuit 73' is determined by the following equation:

$$\lambda_{VC2} = 1 - \frac{V}{V_{C2}} \quad \text{(XIX)}$$

This value is derived similarly as in generating circuit 72'.

Figure 11:
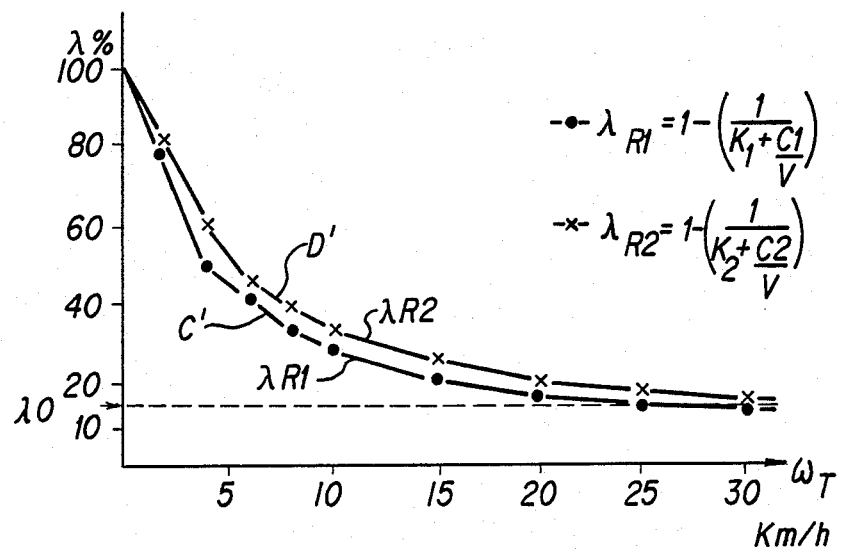
FIG. 11 is a graph showing the trailing wheel speed versus the slip rate for the embodiment of FIG. 10.

FIG. 11 is a graph illustrating the trailing wheel speed $\omega_T$ versus the slip rate λ. The trailing wheel speed $\omega_T$ is represented on the horizontal axis and the slip rate λ is represented on the vertical axis. The first reference value $\lambda_{R1}$ generated in generating circuit 72' is determined according to equation X and is illustrated by curve C' in FIG. 11. Accordingly, the second reference value $\lambda_{R2}$ generated in generating circuit 73' is determined according to equation XVIII and is illustrated by curve D' in FIG. 11.

FIG. 9C shows the alternate embodiment (as illustrated in FIG. 10) wherein the slip rate λ is shown as a function of time t. The reference values $\lambda_{R1}$ and $\lambda_{R2}$ are similarly illustrated as in FIG. 11. FIG. 9C may be compared with the differential slip rate graph of FIG. 9B above since FIGS. 9B and 9C are aligned with respect to one another. The solid curve represents the slip rate λ. When, in FIG. 9C, λ is greater than $\lambda R_2$ as shown at reference numerals 94, 95 and 96, then comparator 69 of FIG. 10 is turned ON to activate the excessive λ circuit and a driving wheel slip control signal is issued. When λ is greater than $\lambda_{R1}$ as shown at reference numerals 97, 98 and 99 and labeled as PC (comp 68), then comparator 68 of FIG. 10 is turned ON to activate one-half of the prediction control circuit. Arrows 97, 98 and 99 of FIG. 9C may be compared with arrows 81, 82 and 83 of FIG. 9B to determine whether or not the prediction control circuit will be activated.

Figure 12:
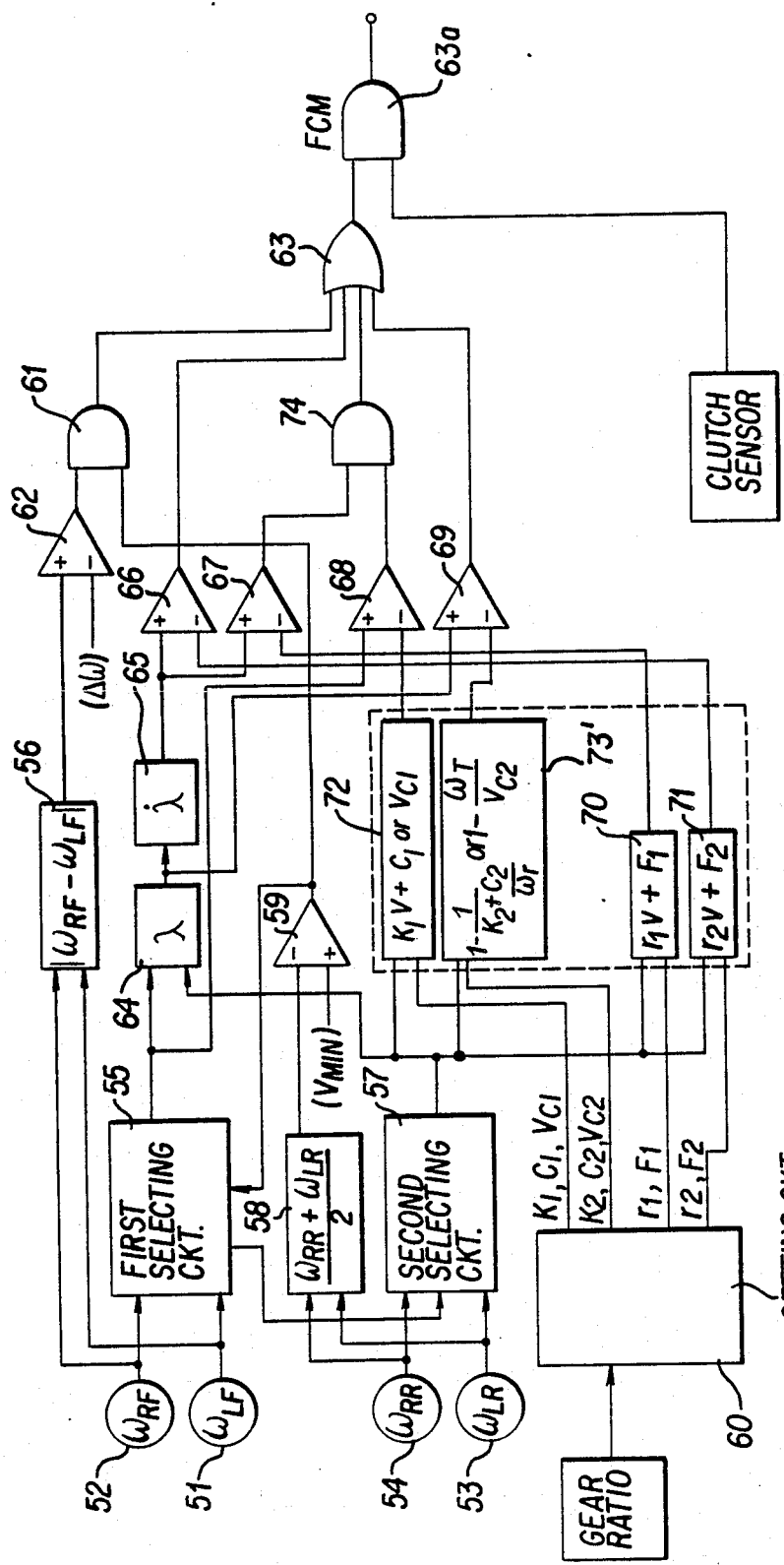
FIG. 12 is a schematic diagram illustrating a third embodiment of a logic circuit of the ECU of FIG. 2.
Figure 13:
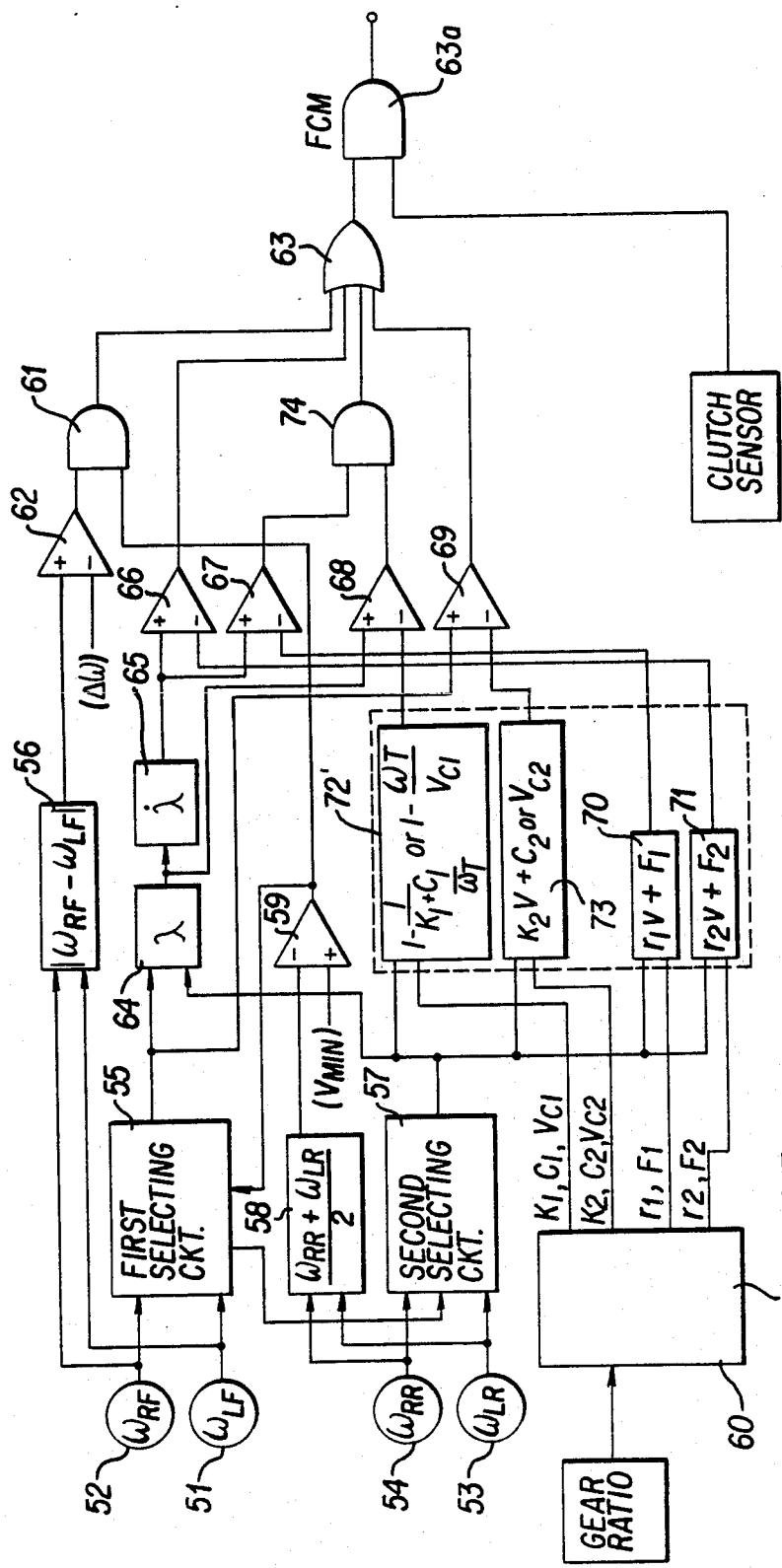
FIG. 13 is a schematic diagram illustrating a fourth embodiment of a logic circuit of the ECU of FIG. 2.

FIGS. 12 and 13 are third and fourth embodiments of the circuit of CPU 35 b. Basically, FIG. 7 represents the first embodiment, and FIG. 10 represents the second embodiment of the invention. In FIG. 10, the prediction control circuit (comparator 68) and excessive λ circuit (comparator 69) use the slip rate λ to compare with reference values rather than comparing the driving wheel speed signal with reference values. FIGS. 12 and 13 are embodiments which employ parts of FIGS. 7 and 10.

For example, in FIG. 12, comparator 68 of the prediction control receives its positive input from selecting circuit 55, as in FIG. 7. The minus input of comparator 68 receives the output of reference generating circuit 72, also as in FIG. 7. However, comparator 69 of the excessive λ circuit receives its positive input from the slip rate calculating circuit 64, and its negative input from reference generating circuit 73'. Further, circuit 73' provides a slip rate reference value to comparator 69 as in the embodiment of FIG. 10.

With regard to FIG. 13, comaprator 68 of the prediction control circuit receives its positive input from slip rate calculating circuit 64, as in FIG. 10. The negative input of comparator 68 receives a slip rate reference value from reference geneating circuit 72', also as in FIG. 10. However, comparator 69 of the excessive λ circuit receives its positive input from first selecting circuit 55, and its negative input from generating circuit 73. The speed reference value from circuit 73 is provided to comparator 69 as in the embodiment of FIG. 7. Otherwise, FIGS. 12 and 13 are similar to FIGS. 7 and 10.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention as set forth in the following claims.

We claim:

1. A control system for controlling the slip of a driving wheel of a vehicle having at least two driving wheels, said system comprising:
   a driving wheel speed sensor means for sensing the speed of said driving wheels and for generating a driving wheel speed signal as a function thereof;
   a vehicle speed sensor means for sensing the speed of said vehicle and for generating a vehicle speed signal as a function thereof;
   a first selecting circuit means, included within said driving wheel speed sensor means and operatively connected to said vehicle speed sensor means, for selecting the speed of only one of said driving wheels, on opposing sides of the vehicle, as said driving wheel speed signal, such that when the vehicle speed is below a predetermined value, said first selecting means selects the speed of the slower of said driving wheels as said driving wheel speed signal, and
   control means responsive to said driving wheel speed signal from said first selecting circuit means for controlling the slip of said driving wheel.

2. A control system for controlling the slip of a driving wheel of a vehicle, said system comprising:
   a driving wheel speed sensor means for sensing the speed of a driving wheel and for generating a driving wheel speed signal as a function thereof;

a vehicle speed sensor means for sensing the speed of said vehicle and for generating a vehicle speed signal as a function thereof;

setting circuit means for generating a first predetermined constant value ($C_2$) signal and a constant level signal ($V_{C2}$);

generating means operatively connected to said vehicle speed sensor means and to said setting circuit means, for generating a speed reference value which is the larger of two values, the first value being a function of the sum of said vehicle speed signal and said first predetermined constant value signal and the second value being said constant level signal ($V_{C2}$);

detecting means, operatively connected to said driving wheel speed sensor means and said generating means, for detecting an excess slip condition when said driving wheel speed signal is greater than said speed reference value, and outputting an excess slip signal when said excess slip condition is detected; and output means coupled to said detecting means, for providing a driving wheel slip control signal in response to the output of said detecting means.

3. A control system for controlling the slip of a driving wheel of a vehicle, said system comprising:

a driving wheel speed sensor means for sensing the speed of a driving wheel and for generating a driving wheel signal as a function thereof;

vehicle speed sensor means for sensing the speed of said vehicle and for generating a vehicle speed signal as a function thereof;

slip rate calculating means, coupled to said driving wheel speed sensor means and said vehicle speed sensor means for calculating the slip rate of the driving wheel with respect to the movement of said vehicle as a function of said driving wheel speed signal and said vehicle speed signal and for generating a slip rate signal in accordance therewith;

setting circuit means for generating a first predetermined constant value ($C_2$) signal and a constant level signal ($V_{C2}$);

a generating means, operatively connected to said vehicle speed sensor means and said setting circuit means, for generating a slip rate reference value which is the larger of two values, the first value being a function of said vehicle speed signal and said first predetermined constant value signal ($C_2$) and the second value being a function of said vehicle speed and said constant level signal ($V_{C2}$)

a detecting means, operatively connected to said slip rate calculating means and said generating means, for detecting an excess slip condition and outputting an excess slip signal when said slip rate signal is greater than said slip rate reference value; and output means coupled to said detecting means, for providing a driving wheel slip control signal in response to the output of said detecting means.

4. A control system for controlling the slip of a driving wheel of a vehicle, said system comprising:

driving wheel speed sensor means for sensing the speed of a driving wheel and for generating a driving wheel speed signal as a function thereof;

vehicle speed sensor means for sensing the speed of the vehicle and for generating a vehicle speed signal as a function thereof;

slip rate calculating means, coupled to said driving wheel speed sensor means and said vehicle speed sensor means for calculating the slip rate of the driving wheel with respect to the movement of said vehicle as a function of said driving wheel speed signal and said vehicle speed signal and for generating a slip rate signal in accordance therewith;

differentiating means, coupled to said slip rate calculating means, for calculating the differential value ($\lambda^\bullet$) of said slip rate;

a reference determination means, operatively connected to said vehicle speed sensor means, for generating a differential reference value as a function of said vehicle speed signal;

a detecting means, operatively coupled to said differentiating means and said reference determination means, for detecting an excess slip condition and outputting an excess slip signal when said differential value of said slip rate is greater than said differential reference value; and output means, coupled to said detecting means, for providing a driving wheel slip control signal in response to said excess slip signal output from said detecting means.

5. A control system for controlling the slip of a driving wheel of a vehicle, said system comprising:

driving wheel speed sensor for sensing the speed of a driving wheel and for generating a driving wheel signal as a function thereof;

vehicle speed sensor means for sensing the speed of said vehicle and for generating a vehicle speed signal as a function thereof;

slip rate calculating means, coupled to said driving wheel speed sensor means and said vehicle speed sensor means for calculating the slip rate of the driving wheel with respect to the movement of said vehicle as a function of said driving wheel speed signal and said vehicle speed signal and for generating a slip rate signal in accordance therewith;

differentiating means, coupled to said slip rate calculating mean, for calculating the differential value ($\lambda^\bullet$) of said slip rate;

setting circuit means for generating a first predetermined constant value signal ($F_1$), a second predetermined constant value signal ($C_1$), and a constant level signal ($V_{C1}$);

reference determination means, operatively connected to said setting circuit means, for generating a differential reference value as a function of said first predetermined constant value signal ($F_1$);

first detecting means, operatively coupled to said differentiating means and said reference determination means, for detecting a first slip condition and outputting a first slip signal when said differential value of said slip rate is greater than said differential reference value;

first generating means, operatively coupled to said vehicle speed sensor means and to said setting circuit means, for generating a speed reference value which is the larger of two values, the first value being a function of the sum of said vehicle speed signal and said second predetermined constant value signal ($C_1$) and the second value being said constant level signal ($V_{C1}$);

second detecting means, coupled to said first generating means and said driving wheel speed sensor means, for detecting a second slip condition and utputting a second slip signal when said driving wheel speed signal is greater than said speed reference value; and output means, coupled to said first and second detecting means, for providing a driving wheel slip control signal when both said first and second detecting means output said first and second slip signals.

6. A control system for controlling the slip of a driving wheel of a vehicle, said system comprising:

driving wheel speed sensor means for sensing the speed of a driving wheel and for generating a driving wheel signal as a function thereof;

vehicle speed sensor means for sensing the speed of said vehicle and for generating a vehicle speed signal as a function thereof;

slip rate calculating means, coupled to said driving wheel speed sensor means and said vehicle speed sensor means for calculating the slip rate of the driving wheel with respect to the movement of said vehicle as a function of said driving wheel speed signal and said vehicle speed signal and for generating a slip rate signal in accordance therewith;

differentiating means, coupled to said slip rate calculating means, for calculating the differential value ($\lambda^\bullet$) of said slip rate;

setting circuit means for generating a first predetermined constant value signal ($F_1$), a second predetermined constant value signal ($C_1$), and a constant level signal ($V_{C1}$);

reference determination means, operatively connected to said vehicle speed sensor means and to said setting circuit means, for generating a differential reference value as a function of the sum of said vehicle speed signal and said first predetermined constant value signal ($F_1$);

first detecting means, coupled to said differentiating means and said reference determination means, for detecting a first slip condition and outputting a first slip signal when said differential value of said slip rate is greater than said differential reference value;

first generating means, operatively coupled to said vehicle speed sensor means and to said setting circuit means, for generating a slip rate reference value which is the larger of two values, the first value being a function of said vehicle speed signal and said second predetermined constant value signal ($C_1$) and the second value being a function of said constant level signal ($V_{C1}$) and said vehicle speed signal;

second detecting means, coupled to said first generating means and said slip rate calculating means, for detecting a second slip condition and outputting a second slip signal when said slip rate is greater than said slip rate reference value; and output means coupled to said first and second detecting means for providing a driving wheel slip control signal when both said first and second detecting means output said first and second slip signals.

7. A control system for controlling the slip of a driving wheel of a vehicle, said system comprising:

driving wheel speed sensor means for sensing the speed of a driving wheel and for generating a driving wheel speed signal as a function thereof;

vehicle speed sensor means for sensing the speed of the vehicle and for generating a vehicle speed signal as a function thereof;

slip rate calculating means, coupled to said driving wheel speed sensor means and said vehicle speed sensor means for calculating a slip rate of the driving wheel with respect to the movement of said vehicle as a function of said driving wheel speed signal and said vehicle speed signal and for generating a slip rate signal in accordance therewith;

differentiating means, coupled to said slip rate calculating means, for calculating the differential value ($\lambda^\bullet$) of said slip rate;

setting circuit means for generating a first predetermined constant value signal ($F_2$), a second predetermined constant value signal ($F_1$), a third predetermined constant value signal ($C_1$), a fourth predetermined constant value signal ($C_2$), a first constant level signal ($V_{C1}$), and a second constant level signal ($V_{C2}$);

a first reference determination means, operatively connected to said vehicle speed sensor means and to said setting circuit means, for generating a first differential reference value as a function of the sum of said vehicle speed signal and said first predetermined constant value signal ($F_2$);

a first detecting means, operatively coupled to said differentiating means and said first reference determination means, for detecting an excess slip condition and outputting an excess slip signal when said differential value of said slip rate is greater than said first differential reference value;

a second reference determination means, operatively connected to said vehicle speed sensor means and to said setting circuit means, for generating a second differential reference value as a function of the sum of said vehicle speed signal and said second predetermined constant value signal ($F_1$);

second detecting means, operatively coupled to said differentiating means and said second reference determination means, for detecting a first slip condition and outputting a first slip signal when said differential value of said slip rate is greater than said second differential reference value;

first generating means, operatively coupled to said vehicle speed sensor means and to said setting circuit means, for generating a first speed reference value which is the larger of two values, the first value being a function of the sum of said vehicle speed signal and said third predetermined constant value signal ($C_1$) and the second value being said first constant level signal ($V_{C1}$);

third detecting means, coupled to said first generating means and said driving wheel speed sensor means, for detecting a second slip condition and outputting a second slip signal when said driving wheel speed signal is greater than said first speed reference value;

second generating means operatively connected to said vehicle speed sensor means and to said setting circuit means, for generating a second speed reference value which is the larger of two values, the first value being a function of the sum of said vehicle speed signal and said fourth predetermined constant value signal ($C_2$) and the second value being said second constant level signal ($V_{C2}$);

fourth detecting means, operatively connected to said driving wheel speed sensor means and said second generating means, for detecting an excess slip condition, and outputting an excess slip signal when said driving wheel signal is greater than said second speed reference value; and output means coupled to said first, second, third and fourth detecting means for providing a driving wheel slip control signal when at least one of (i) said first detecting means outputs an excess slip signal, (ii) said second and third detecting means both output said first and second slip signals, and (iii) said fourth detecting means outputs an excess slip signal.

8. A control system for controlling the slip of a driving wheel of a vehicle, said system comprising:

driving wheel speed sensor means for sensing the speed of a driving wheel and for generating a driving wheel speed signal as a function thereof;

vehicle speed sensor means for sensing the speed of the vehicle and for generating a vehicle speed signal as a function thereof;

slip rate calculating means, coupled to said driving wheel speed sensor means and said vehicle speed sensor means for calculating the slip rate of the driving wheel with respect to the movement of said vehicle as a function of said driving wheel speed signal and said vehicle speed signal and for generating a slip rate signal in accordance therewith;

differentiating means, coupled to said slip rate calculating means, for calculating the differential value ($\lambda^*$) of said slip rate;

setting circuit means for generating a first predetermined constant value signal ($F_2$), a second predetermined constant value signal ($F_1$), a third predetermined constant value signal ($C_1$), a fourth predetermined constant value signal ($C_2$), a first constat level signal ($C_{C1}$), and a second constant level signal ($V_{C2}$);

a first reference determination means, operatively connected to said vehicle speed sensor means and to said setting circuit means, for generating a first differential reference value as a function of the sum of said vehicle speed signal and said first predetermined constant value signal ($F_2$);

a first detecting means, operatively coupled to said differentiating means and said first reference determination means, for detecting an excess slip condition and outputting an excess slip signal when said differential value of said slip rate is greater than said first differential reference value;

a second reference determination means, operatively connected to said vehicle speed sensor means and to said setting circuit means, for generating a second differential reference value as a function of the sum of said vehicle speed signal and said second predetermined constant value signal ($F_1$);

second detecting means, coupled to said differentiating means and said second reference determination means, for detecting a first slip condition and outputting a first slip signal when said differential value of said slip rate is greater than said second differential reference value;

first generating means, operatively coupled to said vehicle speed sensor means and to said setting circuit means, for generating a slip rate reference value which is the larger of two values, the first value being a function of said vehicle speed signal and said third predetermined constant value signal ($C_1$) and the second value being a function of said first constant level signal ($V_{C1}$) and said vehicle speed signal;

third detecting means, coupled to said first generating means and said slip rate calculating means, for detecting a second slip condition and outputting a second slip signal when said slip rate is greater than said slip rate reference value; and second generating means operatively connected to said vehicle speed sensor means and to said setting circuit means, for generating a speed reference value which is the larger of two values, the first value being a function of the sum of said vehicle speed signal and said fourth predetermined constant value signal ($C_2$) and the second value being said second constant level signal ($V_{C2}$);

fourth detecting means, operatively connected to said driving wheel speed sensor means and said second generating means, for detecting an excess slip condition, and outputting an excess slip signal when said driving wheel signal is greater than said speed reference value; and output means coupled to said first, second, third and fourth detecting means for providing a driving wheel slip control signal when at least one of (i) said first detecting means outputs an excess slip signal, (ii) said second and third detecting means both output said first and second slip signals, and (iii) said fourth detecting means outputs an excess slip signal.

9. A control system for controlling the slip of a driving wheel of a vehicle, said system comprising:

driving wheel speed sensor means for sensing the speed of a driving wheel and for generating a driving wheel speed signal as a function thereof;

vehicle speed sensor means for sensing the speed of the vehicle and for generating a vehicle speed signal as a function thereof slip rate calculating means, coupled to said driving wheel speed sensor means and said vehicle speed sensor means for calculating the slip rate of the driving wheel with respect to the movement of said vehicle as a function of said driving wheel speed signal and said vehicle speed signal and for generating a slip rate signal in accordance therewith;

differentiating means, coupled to said slip rate calculating means, for calculating the differential value ($\lambda$) of said slip rate;

setting circuit means for generating a first predetermined constant value signal ($F_2$), a second predetermined constant value signal ($F_1$), a third predetermined constant value signal ($C_1$), a fourth predetermined constant value signal ($C_2$), a first constant level signal ($V_{C1}$), and a second constant level signal ($V_{C2}$);

a first reference determination means, operatively connected to said vehicle speed sensor means and to said setting circuit means, for generating a first differential reference value as a function of the sum of said vehicle speed signal and said first predetermined constant value signal ($F_2$);

a first detecting means, operatively coupled to said differentiating means and said first reference determination means, for detecting an excess slip condition and outputting an excess slip signal when said differential value of said slip rate is greater than said first differential reference value;

a second reference determination means, operatively connected to said vehicle speed sensor means and to said setting circuit means, for generating a second differential reference value as a function of the sum of said vehicle speed signal and said second predetermined constant value signal ($F_1$);

second detecting means, operatively coupled to said differentiating means and said second reference determination means, for detecting a first slip condition and outputting a first slip signal when said differential value of said slip rate is greater than said second differential reference value;

first generating means, operatively coupled to said vehicle speed sensor means and to said setting circuit means, for generating a speed reference value which is the larger of two values, the first value being a function of the sum of said vehicle speed signal and said third predetermined constant value signal ($C_1$) and the second value being said first constant level signal ($V_{C1}$);

third detecting means, coupled to said first generating means and said driving wheel speed sensor means, for detecting a second slip condition and outputting a second slip signal when said driving wheel speed signal is greater than said speed reference value;

second generating means, operatively connected to said vehicle speed sensor means and said setting circuit means, for generating a slip rate reference value which is the larger of two values, the first value being a function of said vehicle speed signal and said fourth predetermined constant value signal ($C_2$) and the second value being a function of said vehicle speed and said second constant level signal ($V_{C2}$);

fourth detecting means, operatively connected to said slip rate calculating means and said second generating means, for detecting an excess slip condition and outputting an excess slip signal when said slip rate signal is greater than said slip rate reference value; and output means coupled to said first, second, third and fourth detecting means for providing a driving wheel slip control signal when at least one of
  (i) said first detecting means outputs an excess slip signal,
  (ii) said second and third detecting means both output said first and second slip signals, and
  (iii) said fourth detecting means outputs an excess slip signal.

10. A control system for controlling the slip of a driving wheel of a vehicle, said system comprising:

driving wheel speed sensor means for sensing the speed of a driving wheel and for generating a driving wheel speed signal as a function thereof;

vehicle speed sensor means for sensing the speed of the vehicle and for generating a vehicle speed signal as a function thereof;

slip rate calculating means, coupled to said driving wheel speed sensor means and said vehicle speed sensor means for calculating the slip rate of the driving wheel with respect to the movement of said vehicle as a function of said driving wheel speed signal and said vehicle speed signal and for generating a slip rate signal in accordance therewith;

differentiating means, coupled to said slip rate calculating means, for calculating the differential value ($\lambda$) of said slip rate;

setting circuit means for generating a first predetermined constant value signal ($F_2$), a second predetermined constant value signal ($F_1$), a third predetermined constant value signal ($C_1$), a fourth predetermined constant value signal ($C_2$), a first constant level signal ($V_{C1}$), and a second constant level signal ($V_{C2}$);

a first reference determination means, operatively connected to said vehicle speed sensor means and to said setting circuit means, for generating a first differential reference value as a function of the sum of said vehicle speed signal and said first predetermined constant value signal ($F_2$);

a first detecting means, operatively coupled to said differentiating means and said first reference determination means, for detecting an excess slip condition and outputting an excess slip signal when said differential value of said slip rate is greater than said first differential reference value;

a second reference determination means, operatively connected to said vehicle speed sensor means and to said setting circuit means, for generating a second differential reference value as a function of the sum of said vehicle speed signal and said second predetermined constant value signal ($F_1$);

second detecting means, coupled to said differentiating means and said second reference determination means, for detecting a first slip condition and outputting a first slip signal when said differential value of said slip rate is greater than said second differential reference value;

first generating means, operatively coupled to said vehicle speed sensor means and to said setting circuit means, for generating a first slip rate reference value which is the larger of two values, the first value being a function of said vehicle speed signal and said third predetermined constant value signal ($C_1$) and the second value being a function of said first constant level signal ($V_{C1}$) and said vehicle speed signal;

third detecting means, coupled to said first generating means and said slip rate calculating means, for detecting a second slip condition and outputting a second slip signal when said slip rate is greater than said first slip rate reference value;

second generating means, operatively connected to said vehicle speed sensor means and said setting circuit means, for generating a second slip rate reference value which is the larger of two values, the first value being a function of said vehicle speed signal and said fourth predetermined constant value signal ($C_2$) and the second value being a function of said vehicle speed and said second constant level signal ($V_{C2}$);

fourth detecting means, operatively connected to said slip rate calculating means and said second generating means, for detecting an excess slip condition and outputting an excess slip signal when said slip rate signal is greater than said second slip rate reference value; and output means coupled to said first, second, third and fourth detecting means for providing a driving wheel slip control signal when at least one of
  (i) said first detecting means outputs an excess slip signal,
  (ii) said second and third detecting means both output said first and second slip signals, and
  (iii) said fourth detecting means outputs an excess slip signal.

11. The control system of claim 2, wherein said driving wheel speed sensor means includes a first selecting circuit means, being operatively connected to said vehicle speed sensor means, for generating said driving wheel speed signal.

12. The control system of claim 3, wherein said driving wheel speed sensor means includes a first selecting circuit means, being operatively connected to said vehicle speed sensor means, for generating said driving wheel speed signal.

13. The control system of claim 4, wherein said driving wheel speed sensor means includes a first selecting circuit means, being operatively connected to said vehicle speed sensor means, for generating said driving wheel speed signal.

14. The control system of claim 5, wherein said driving wheel speed sensor means includes a first selecting circuit means, being operatively connected to said vehicle speed sensor means, for generating said driving wheel speed signal.

15. The control system of claim 6, wherein said driving wheel speed sensor means includes a first selecting circuit means, being operatively connected to said vehicle speed sensor means, for generating said driving wheel speed signal.

16. The control system of claim 7, wherein said driving wheel speed sensor means includes a first selecting circuit means, being operatively connected to said vehicle speed sensor means, for generating said driving wheel speed signal.

17. The control system of claim 8, wherein said driving wheel speed sensor means includes a first selecting circuit means, being operatively connected to said vehicle speed sensor means, for generating said driving wheel speed signal.

18. The control system of claim 9, wherein said driving wheel speed sensor means includes a first selecting circuit means, being operatively connected to said vehicle speed sensor means, for generating said driving wheel speed signal.

19. The control system of claim 10, wherein said driving wheel speed sensor means includes a first selecting circuit means, being operatively connected to said vehicle speed sensor means, for generating said driving wheel speed signal.

20. The control system of any one of claims 11-19, wherein said first selecting circuit means selects the speed of only one of said driving wheels, on opposing sides of the vehicle, as said driving wheel speed signal.

21. The control system of claim 20, wherein when said vehicle speed is below a predetermined value, said first selecting circuit means selects the speed of the slower of said driving wheels as said driving wheel speed signal.

22. The control system of claim 20, wherein when said vehicle speed is above a predetermined value, said first selecting circuit means selects the speed of the faster of said driving wheels as said driving wheel speed signal.

23. The control system of claim 21, and wherein when said vehicle speed is above said predetermined value, said first selecting means selects the speed of the faster of said driving wheels as said driving wheel speed signal.

24. The control system of claim 23, wherein said predetermined value is determined by the average of two trailing wheel speeds sensed from two trailing wheels on opposing sides of said vehicle.

25. The control system of claim 23, wherein said vehicle speed signal includes two trailing wheel speed signals sensed from two trailing wheels disposed on opposing sides of said vehicle.

26. The control system of claim 25, including a second selecting circuit means, receiving said two trailing wheel speed signals from said vehicle speed sensor means and being operatively connected to said first selecting circuit means, for generating a selected vehicle speed signal as a function of said two trailing wheel speed signals.

27. The control system of claim 26, wherein said second selecting circuit means selects one of said two trailing wheel signals as said selected vehicle speed signal, said selected trailing wheel signal corresponding to the trailing wheel on the same side of said vehicle as said one selected driving wheel selected by said first selecting circuit means.

28. The control system of claim 23, including means for comparing the sensed speed of said driving wheels, and for generating an output signal as a function of a difference between said driving wheel speeds, when said difference exceeds a predetermined difference value and when said vehicle speed is below said predetermined value, and wherein said control means is also responsive to said output signal for controlling the slip of said driving wheel.

29. The control system of any one of claims 5, 7 and 9 wherein said setting circuit means further generates a first predetermined coefficient and wherein said function of the vehicle speed generated in said first generating means is the product of said vehicle speed and said first predetermined coefficient.

30. The control system of any one of claims 6, 8 and 10 wherein said setting circuit means further generates a predetermined operational constant ($K_1$); and said first generating means determines the first value $\lambda_{R1}$ as follows:

$$\lambda_{R1} = 1 - 1 - \frac{1}{K_1 + \frac{C_1}{V}},$$

where $\lambda_{R1}$ is said first value.

31. The control system of any one of claims 7 and 8 wherein said setting circuit means further generates a second predetermined coefficient ($K_2$) and wherein said second generating means generates said first value as a function of the sum of said fourth predetermined constant value and the product of said second predetermined coefficient ($K_2$) and said vehicle speed signal.

32. The control system of claim 2, wherein said setting circuit means further generates a second predetermined coefficient ($K_2$) and wherein said generating means generates said first value as a function of the sum of said first predetermined constant value and the product of said second predetermined coefficient ($K_2$) and said vehicle speed signal.

33. The control system of any one of claims 9 and 10 wherein said setting circuit means generates a predetermined operational constant ($K_2$), and wherein said first value of said second generating means is $$\lambda_{R2} = 1 - \frac{1}{K_2 + \frac{C_2}{V}}$$

and where V is said vehicle speed signal.

34. The control system of claim 3, wherein said setting circuit means generates a predetermined operational constant ($K_2$), and wherein said first value of said generating means is $$\lambda_{R2} = 1 - \cfrac{1}{K_2 + \cfrac{C_2}{V}}$$

and where V is said vehicle speed signal.

35. The control system of any one of claims 1-10 wherein said output means is coupled to means for decreasing engine torque.

36. The control system of any one of claims 1-10 wherein said output means is coupled to means for cutting fuel supply to the engine.

37. The control system of any one of claims 1-10 further comprising clutch signal means for generating a clutch engaged signal when the clutch of said vehicle is engaged and means coupled to said clutch signal means and said output means for providing an output when both said clutch signal and said driving wheel slip control signal are applied thereto.

38. The control system of any one of claims 1-10 including means for generating a gear ratio signal, coupled to said setting circuit means, for controlling the output thereof as a function of the gear ratio of the vehicle.

39. The control system of claim 1, wherein said predetermined value is determined by the average of two trailing wheel speeds sensed from two trailing wheels on opposing sides of said vehicle.

40. The control system of claim 1, wherein said control means further is responsive to said vehicle speed from said vehicle speed sensor means.

41. The control system of claim 40, wherein said vehicle speed signal sensor means include two trailing wheel speed sensors from two trailing wheels on opposing sides of said vehicle.

42. The control system of claim 41, including a second selecting circuit means, receiving said two trailing wheel speed signals from said vehicle speed sensor means and being operatively connected to said first selecting circuit means, for generating a selecting vehicle speed signal as a function of said two trailing wheel speed signals.

43. The control system of claim 42, wherein said second selecting circuit means selects one of said two trailing wheel signals as said selected vehicle speed signal, said selected trailing wheel signal corresponding to the trailing wheel on the same side of said vehicle as said one selected driving wheel selected by said first selecting circuit means.

44. The control system of claim 4, including a setting circuit means for generating a first predetermined constant value signal ($F_2$), and wherein said reference determination means is also operatively connected to said setting circuit means, for generating said differential reference value as a function of the sum of said vehicle speed signal and said first predetermined constant value signal ($F_2$).

45. The control system of claim 5, wherein said reference determination means is also operatively connected to said vehicle speed sensor means, for generating said differential reference value as a function of the sum of said vehicle speed signal and said first predetermined constant value signal ($F_4$).

* * * * *